US008591308B2

(12) United States Patent
Hoffman et al.

(10) Patent No.: US 8,591,308 B2
(45) Date of Patent: Nov. 26, 2013

(54) GAMING SYSTEM AND METHOD PROVIDING INDICATION OF NOTABLE SYMBOLS INCLUDING AUDIBLE INDICATION

(75) Inventors: Benjamin C. Hoffman, Reno, NV (US); Christmas C. Parker, Reno, NV (US); Paulina Rodgers, Reno, NV (US)

(73) Assignee: IGT, Las Vegas, NV (US)

( * ) Notice: Subject to any disclaimer, the term of this patent is extended or adjusted under 35 U.S.C. 154(b) by 1477 days.

(21) Appl. No.: 12/208,107

(22) Filed: Sep. 10, 2008

(65) Prior Publication Data

US 2010/0062827 A1 Mar. 11, 2010

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .................... 463/19; 463/20; 463/25; 463/30

(58) Field of Classification Search
USPC .......................................... 463/19, 20, 25, 30
See application file for complete search history.

(56) References Cited

U.S. PATENT DOCUMENTS

| | | | |
|---|---|---|---|
| 3,831,172 | A | 8/1974 | Olliges et al. |
| 4,300,225 | A | 11/1981 | Lambl |
| 4,314,236 | A | 2/1982 | Mayer et al. |
| 4,339,798 | A | 7/1982 | Hedges et al. |
| 4,344,345 | A | 8/1982 | Sano |
| 4,363,482 | A | 12/1982 | Goldfarb |
| RE31,441 | E | 11/1983 | Nutting et al. |
| 4,496,149 | A | 1/1985 | Schwartzberg |
| 4,582,324 | A | 4/1986 | Koza et al. |
| 4,618,150 | A | 10/1986 | Kimura |
| 4,624,459 | A | 11/1986 | Kaufman |
| 4,660,107 | A | 4/1987 | Chippendale, Jr. |
| 4,695,053 | A | 9/1987 | Vazquez, Jr. et al. |
| 4,712,189 | A | 12/1987 | Mohri |

(Continued)

FOREIGN PATENT DOCUMENTS

| | | |
|---|---|---|
| EP | 0 945 837 A2 | 9/1999 |
| EP | 0 978 809 A2 | 2/2000 |

(Continued)

OTHER PUBLICATIONS

Article, "A Salute to Game Shows—The Price Is Right—Pricing Games—Three Strikes," p. 8 of 9, online, retrieved on Aug. 16, 2000. Retrieved from the Internet: <http://ben-schumin.simplenet.com/game-shows/shows/price-is-right/pricing-games-4.htm> and available in the year 2000 on or before Aug. 16 thereof.

(Continued)

*Primary Examiner* — William M. Brewster
(74) *Attorney, Agent, or Firm* — Neal, Gerber & Eisenberg LLP

(57) ABSTRACT

The gaming device and method disclosed herein produces an indication of an appearance of a notable or designated symbol in a symbol display region while at least one reel is spinning. The indication continues while the notable symbol appears in the symbol display region and while the at least one reel is spinning. Different indications are produced for the different notable symbols when appearing in the symbol display region while the at least one reel is spinning.

24 Claims, 16 Drawing Sheets

(56) References Cited

U.S. PATENT DOCUMENTS

| | | | |
|---|---|---|---|
| 4,732,386 | A | 3/1988 | Rayfiel |
| 4,733,593 | A | 3/1988 | Rothbart |
| 4,791,558 | A | 12/1988 | Chaitin et al. |
| 4,876,937 | A | 10/1989 | Suzuki |
| 4,961,575 | A | 10/1990 | Perry |
| 4,974,483 | A | 12/1990 | Luzzatto |
| 4,974,857 | A | 12/1990 | Beall et al. |
| 5,046,735 | A | 9/1991 | Hamano et al. |
| 5,096,195 | A | 3/1992 | Gimmon |
| 5,119,465 | A | 6/1992 | Jack |
| 5,179,517 | A | 1/1993 | Sarbin et al. |
| 5,221,801 | A | 6/1993 | Bruti et al. |
| 5,223,828 | A | 6/1993 | McKiel, Jr. |
| 5,242,163 | A | 9/1993 | Fulton |
| 5,258,574 | A | 11/1993 | Kawano |
| 5,266,736 | A | 11/1993 | Saito |
| 5,275,400 | A | 1/1994 | Weingardt et al. |
| 5,287,102 | A | 2/1994 | McKiel, Jr. |
| 5,331,112 | A | 7/1994 | Sato et al. |
| 5,342,047 | A | 8/1994 | Heidel et al. |
| 5,371,345 | A | 12/1994 | LeStrange et al. |
| 5,390,938 | A | 2/1995 | Takeya |
| 5,393,061 | A | 2/1995 | Manship et al. |
| 5,393,070 | A | 2/1995 | Best |
| 5,429,507 | A | 7/1995 | Kaplan |
| 5,429,513 | A | 7/1995 | Diaz-Plaza |
| 5,430,835 | A | 7/1995 | Williams et al. |
| 5,446,902 | A | 8/1995 | Islam |
| 5,449,173 | A | 9/1995 | Thomas et al. |
| 5,469,511 | A | 11/1995 | Lewis et al. |
| 5,470,233 | A | 11/1995 | Fruchterman et al. |
| 5,472,197 | A | 12/1995 | Gwiasda et al. |
| 5,508,699 | A | 4/1996 | Silverman |
| 5,515,764 | A | 5/1996 | Rosen |
| 5,577,253 | A | 11/1996 | Blickstein |
| 5,606,144 | A | 2/1997 | Dabby |
| 5,611,535 | A | 3/1997 | Tiberio |
| 5,625,845 | A | 4/1997 | Allran |
| 5,630,754 | A | 5/1997 | Rebane |
| 5,655,961 | A | 8/1997 | Acres et al. |
| 5,668,996 | A | 9/1997 | Radinsky |
| 5,695,188 | A | 12/1997 | Ishibashi |
| 5,697,843 | A | 12/1997 | Manship et al. |
| 5,702,304 | A | 12/1997 | Acres et al. |
| 5,703,310 | A | 12/1997 | Kurakake et al. |
| 5,707,286 | A | 1/1998 | Carlson |
| 5,715,459 | A | 2/1998 | Celi |
| 5,741,183 | A | 4/1998 | Acres et al. |
| 5,745,761 | A | 4/1998 | Celi |
| 5,745,762 | A | 4/1998 | Celi |
| 5,752,882 | A | 5/1998 | Acres et al. |
| 5,758,875 | A | 6/1998 | Giacalone, Jr. |
| 5,762,552 | A | 6/1998 | Vuong et al. |
| 5,766,074 | A | 6/1998 | Cannon et al. |
| 5,769,716 | A | 6/1998 | Saffari et al. |
| 5,772,509 | A | 6/1998 | Weiss |
| 5,778,231 | A | 7/1998 | Van Hoff |
| 5,792,972 | A | 8/1998 | Houston |
| 5,802,364 | A | 9/1998 | Senator |
| 5,807,172 | A | 9/1998 | Piechowiak |
| 5,809,303 | A | 9/1998 | Senator |
| 5,812,688 | A | 9/1998 | Gibson |
| 5,820,459 | A | 10/1998 | Acres et al. |
| 5,823,873 | A | 10/1998 | Moody |
| 5,833,538 | A | 11/1998 | Weiss |
| 5,836,817 | A | 11/1998 | Acres et al. |
| 5,839,958 | A | 11/1998 | Ozarow |
| 5,848,932 | A | 12/1998 | Adams |
| 5,854,927 | A | 12/1998 | Gelissen |
| 5,876,284 | A | 3/1999 | Acres et al. |
| 5,880,386 | A | 3/1999 | Wachi et al. |
| 5,889,990 | A | 3/1999 | Coleman |
| 5,892,171 | A | 4/1999 | Ide |
| 5,902,184 | A | 5/1999 | Bennett et al. |
| 5,908,354 | A | 6/1999 | Okuniewicz |
| 5,910,048 | A | 6/1999 | Feinberg |
| 5,911,071 | A | 6/1999 | Jordan |
| 5,920,720 | A | 7/1999 | Toutonghi |
| 5,920,842 | A | 7/1999 | Cooper et al. |
| 5,923,878 | A | 7/1999 | Marsland |
| 5,923,880 | A | 7/1999 | Rose |
| 5,930,509 | A | 7/1999 | Yates |
| 5,937,193 | A | 8/1999 | Evoy |
| 5,946,487 | A | 8/1999 | Dangelo |
| 5,946,489 | A | 8/1999 | Yellin |
| 5,951,397 | A | 9/1999 | Dickinson |
| 5,964,843 | A | 10/1999 | Eisler |
| 5,966,535 | A | 10/1999 | Benedikt |
| 5,967,894 | A | 10/1999 | Kinoshita et al. |
| 5,970,143 | A | 10/1999 | Schneier et al. |
| 5,970,249 | A | 10/1999 | Holzle |
| 5,978,585 | A | 11/1999 | Crelier |
| 5,980,384 | A | 11/1999 | Barrie |
| 5,997,401 | A | 12/1999 | Crawford |
| 5,999,731 | A | 12/1999 | Yellin |
| 6,003,038 | A | 12/1999 | Chen |
| 6,015,346 | A | 1/2000 | Bennett |
| D421,277 | S | 2/2000 | McGahn et al. |
| 6,021,272 | A | 2/2000 | Cahill |
| 6,021,273 | A | 2/2000 | Criesemer |
| 6,026,238 | A | 2/2000 | Bond |
| 6,027,115 | A | 2/2000 | Griswold et al. |
| 6,029,000 | A | 2/2000 | Woolsey |
| 6,031,993 | A | 2/2000 | Andrews |
| 6,035,120 | A | 3/2000 | Ravichandran |
| 6,052,527 | A | 4/2000 | Delcourt et al. |
| 6,056,642 | A | 5/2000 | Bennett |
| 6,062,979 | A | 5/2000 | Inoue |
| 6,066,181 | A | 5/2000 | DeMaster |
| 6,071,192 | A | 6/2000 | Weiss |
| 6,074,432 | A | 6/2000 | Guccione |
| 6,075,940 | A | 6/2000 | Gosling |
| 6,079,985 | A | 6/2000 | Wohl |
| 6,084,169 | A | 7/2000 | Hasegawa et al. |
| 6,089,976 | A | 7/2000 | Schneider et al. |
| 6,089,978 | A | 7/2000 | Adams |
| 6,092,147 | A | 7/2000 | Levy |
| 6,096,095 | A | 8/2000 | Halstead |
| 6,102,400 | A | 8/2000 | Scott et al. |
| 6,103,964 | A | 8/2000 | Kay |
| 6,106,393 | A | 8/2000 | Sunaga et al. |
| 6,110,041 | A | 8/2000 | Walker et al. |
| 6,110,043 | A | 8/2000 | Olsen |
| 6,110,226 | A | 8/2000 | Bothner |
| 6,113,495 | A | 9/2000 | Walker |
| 6,117,009 | A | 9/2000 | Yoseloff |
| 6,126,165 | A | 10/2000 | Sakamoto |
| 6,131,191 | A | 10/2000 | Cierniak |
| 6,138,273 | A | 10/2000 | Sturges |
| 6,141,794 | A | 10/2000 | Dice |
| 6,142,875 | A | 11/2000 | Kodachi et al. |
| 6,146,273 | A | 11/2000 | Olsen |
| 6,146,276 | A | 11/2000 | Okuniewicz |
| 6,155,925 | A | 12/2000 | Giobbi et al. |
| 6,159,096 | A | 12/2000 | Yoseloff |
| 6,159,097 | A | 12/2000 | Gura |
| 6,162,122 | A | 12/2000 | Acres et al. |
| 6,174,233 | B1 | 1/2001 | Sunaga et al. |
| 6,174,235 | B1 | 1/2001 | Walker et al. |
| 6,175,632 | B1 | 1/2001 | Marx |
| 6,186,894 | B1 | 2/2001 | Mayeroff |
| 6,198,395 | B1 | 3/2001 | Sussman |
| 6,217,448 | B1 | 4/2001 | Olsen |
| 6,224,482 | B1 | 5/2001 | Bennett |
| 6,227,971 | B1 | 5/2001 | Weiss |
| 6,233,731 | B1 | 5/2001 | Bond et al. |
| 6,238,288 | B1 | 5/2001 | Walker et al. |
| 6,241,612 | B1 | 6/2001 | Heredia |
| 6,254,481 | B1 | 7/2001 | Jaffe |
| 6,257,981 | B1 | 7/2001 | Acres et al. |
| 6,270,411 | B1 | 8/2001 | Gura et al. |
| 6,290,600 | B1 | 9/2001 | Glasson |
| 6,293,869 | B1 | 9/2001 | Kwan et al. |
| 6,295,638 | B1 | 9/2001 | Brown et al. |

(56) References Cited

U.S. PATENT DOCUMENTS

| | | | |
|---|---|---|---|
| 6,302,790 B1 | 10/2001 | Brossard | |
| 6,302,791 B1 | 10/2001 | Frohm et al. | |
| 6,306,034 B1 | 10/2001 | Sakamoto et al. | |
| 6,309,299 B1 | 10/2001 | Weiss | |
| 6,309,301 B1 | 10/2001 | Sano | |
| 6,311,982 B1 | 11/2001 | Lebensfeld et al. | |
| 6,319,125 B1 | 11/2001 | Acres | |
| 6,321,323 B1 | 11/2001 | Nugroho et al. | |
| 6,328,648 B1 | 12/2001 | Walker et al. | |
| 6,358,147 B1 | 3/2002 | Jaffe et al. | |
| 6,364,768 B1 | 4/2002 | Acres et al. | |
| 6,375,567 B1 | 4/2002 | Acres | |
| 6,375,568 B1 | 4/2002 | Roffman et al. | |
| 6,375,569 B1 | 4/2002 | Acres | |
| 6,390,923 B1 | 5/2002 | Yoshitomi et al. | |
| 6,409,596 B1 | 6/2002 | Hayashida et al. | |
| 6,416,411 B1 | 7/2002 | Tsukahara | |
| RE37,885 E | 10/2002 | Acres et al. | |
| 6,491,584 B2 | 12/2002 | Graham et al. | |
| 6,504,089 B1 | 1/2003 | Negishi et al. | |
| 6,516,466 B1 | 2/2003 | Jackson | |
| 6,533,658 B1 | 3/2003 | Walker et al. | |
| 6,537,152 B2 | 3/2003 | Seelig et al. | |
| 6,544,122 B2 | 4/2003 | Araki et al. | |
| 6,554,703 B1 | 4/2003 | Bussick et al. | |
| 6,561,908 B1 | 5/2003 | Hoke | |
| 6,565,434 B1 | 5/2003 | Acres | |
| 6,565,436 B1 | 5/2003 | Baerlocher | |
| 6,592,457 B1 | 7/2003 | Frohm et al. | |
| 6,599,195 B1 | 7/2003 | Araki et al. | |
| 6,604,740 B1 | 8/2003 | Singer et al. | |
| 6,609,972 B2 | 8/2003 | Seelig et al. | |
| 6,638,169 B2 | 10/2003 | Wilder et al. | |
| 6,656,046 B1 | 12/2003 | Yoseloff et al. | |
| 6,682,073 B2 | 1/2004 | Bryant et al. | |
| 6,729,618 B1 | 5/2004 | Koenig et al. | |
| 6,739,973 B1 | 5/2004 | Lucchesi et al. | |
| 6,755,738 B2 | 6/2004 | Glasson et al. | |
| 6,769,985 B1 | 8/2004 | Laakso et al. | |
| 6,810,517 B2 | 10/2004 | Bond et al. | |
| 6,835,132 B2 | 12/2004 | Bennett | |
| 6,848,996 B2 | 2/2005 | Hecht et al. | |
| 6,935,955 B1 | 8/2005 | Kaminkow et al. | |
| 6,942,574 B1 | 9/2005 | LeMay et al. | |
| 7,105,736 B2 | 9/2006 | Laakso | |
| 7,258,613 B2 * | 8/2007 | Lucchesi et al. | 463/35 |
| 7,355,112 B2 | 4/2008 | Laakso | |
| 2001/0024971 A1 | 9/2001 | Brossard | |
| 2001/0029542 A1 | 10/2001 | Nishimura | |
| 2002/0025844 A1 | 2/2002 | Casey et al. | |
| 2002/0039919 A1 | 4/2002 | Joshi et al. | |
| 2002/0077165 A1 | 6/2002 | Bansemer et al. | |
| 2002/0090990 A1 | 7/2002 | Joshi et al. | |
| 2002/0109718 A1 | 8/2002 | Mansour et al. | |
| 2002/0151349 A1 | 10/2002 | Joshi | |
| 2003/0027619 A1 | 2/2003 | Nicastro | |
| 2003/0064771 A1 | 4/2003 | Morrow | |
| 2003/0064798 A1 | 4/2003 | Grauzer et al. | |
| 2003/0064801 A1 | 4/2003 | Breckner et al. | |
| 2003/0064808 A1 | 4/2003 | Hecht et al. | |
| 2003/0073489 A1 | 4/2003 | Hecht et al. | |
| 2003/0073490 A1 | 4/2003 | Hecht et al. | |
| 2003/0073491 A1 * | 4/2003 | Hecht et al. | 463/35 |
| 2003/0078103 A1 | 4/2003 | LeMay et al. | |
| 2003/0144052 A1 | 7/2003 | Walker et al. | |
| 2004/0048657 A1 | 3/2004 | Gauselmann | |
| 2004/0053695 A1 | 3/2004 | Mattice et al. | |
| 2004/0063489 A1 | 4/2004 | Crumby | |
| 2004/0142739 A1 | 7/2004 | Loose et al. | |
| 2004/0142747 A1 | 7/2004 | Pryzby | |
| 2004/0198489 A1 | 10/2004 | Kaminkow | |
| 2004/0209685 A1 | 10/2004 | Lucchesi et al. | |
| 2004/0242307 A1 | 12/2004 | Laakso | |
| 2005/0043090 A1 | 2/2005 | Pryzby et al. | |
| 2005/0054440 A1 | 3/2005 | Anderson et al. | |
| 2005/0054441 A1 | 3/2005 | Landrum | |
| 2005/0054442 A1 | 3/2005 | Anderson et al. | |
| 2005/0064935 A1 | 3/2005 | Blanco | |
| 2005/0071023 A1 | 3/2005 | Gilliland | |
| 2005/0096121 A1 | 5/2005 | Gilliland | |
| 2005/0277469 A1 | 12/2005 | Pryzby et al. | |
| 2005/0282631 A1 | 12/2005 | Bonney et al. | |
| 2006/0009280 A1 | 1/2006 | Joshi et al. | |
| 2006/0073881 A1 | 4/2006 | Pryzby et al. | |
| 2007/0006708 A1 * | 1/2007 | Laakso | 84/1 |
| 2007/0060295 A1 * | 3/2007 | DeMar et al. | 463/20 |
| 2008/0020836 A1 | 1/2008 | Lucchesi et al. | |

FOREIGN PATENT DOCUMENTS

| | | |
|---|---|---|
| EP | 0 993 847 A1 | 4/2000 |
| EP | 0 997 856 A2 | 5/2000 |
| EP | 0 997 857 A2 | 5/2000 |
| EP | 1 000 642 A2 | 5/2000 |
| EP | 1 079 345 A1 | 2/2001 |
| EP | 1 225 565 A2 | 7/2002 |
| EP | 1 439 507 A3 | 3/2005 |
| GB | 2 201 279 | 8/1988 |
| JP | 11197292 | 12/1997 |
| JP | 11216221 | 8/1999 |
| JP | 2000107466 | 4/2000 |
| JP | 02000296209 | 10/2000 |
| JP | 2001062029 | 3/2001 |
| JP | 2003290422 | 10/2003 |
| WO | WO 97/32285 | 9/1997 |
| WO | WO 02/17295 | 2/2002 |
| WO | WO 2004/025583 | 3/2004 |
| WO | WO 2005/026883 | 3/2005 |
| WO | WO 2005/026894 | 3/2005 |
| WO | WO 2005/027059 | 3/2005 |
| WO | WO 2005/113089 | 12/2005 |
| WO | WO 2005/113091 | 12/2005 |
| WO | WO 2005/114598 | 12/2005 |
| WO | WO 2005/117647 | 12/2005 |
| WO | WO 2005/120127 | 12/2005 |
| WO | WO 2006/017036 | 2/2006 |
| WO | WO 2006/017445 | 2/2006 |
| WO | WO 2007/044175 | 4/2007 |

OTHER PUBLICATIONS

Article, "Frankie & Annette's Beach Party Bally Gaming," published by Strictly Slots, Dec. 2001.

Article, "Megaman X's Soundcard History Museum," pp. 1-5, retrieved on May 11, 2000 on Internet at http://digitalparadise.cgocable.ca/MegaMan_X/Soundcards and available in the year 2000 on or before May 11 thereof.

Article, "Microprocessor Report," pp. 2, 12-17, published by Micro Design Resources on Mar. 25, 1996.

Article, "Monopoly Movers & Shakers Williams/WMS Gaming," published by Strictly Slots publication in Jul. 2000.

Article, "Thunder Warrior, Konami Gaming," published by Global Gaming Business, Feb. 2008 and retrieved from http://ggbmagazine.com/articles/Thunder_Warrior.

Article, "Vibrant 7s, Konami Gaming," published by Global Gaming Business, Dec. 2007 and retrieved from http://ggbmagazine.com/articlesVibrant_7s.

Banana-Rama Brochure, published by Silicon Gaming, available in the year 2000 on or before December thereof.

Break the Spell Brochure, published by Atronics in the year 1999 on or before December thereof.

Brochure of Bally Gaming, Inc., "EVO Hybrid Frankie & Annette's Beach Party," published by Bally Gaming, Inc. in the year 2001 on or before December thereof.

Brochure of IGT, "Elephant King," http://www.igt.com/games/new_games/elephant.html, Mar. 21, 2001.

Brochure of IGT, "Leopard Spots, Double Diamond 2000, Little Green Men, Elephant King, I Dream of Jeannie," available in the year 1999 on or before October thereof.

Brochure of IGT, "Run for Your Money S-Plus Limited," published in the year 1998 on or before December thereof.

(56) References Cited

OTHER PUBLICATIONS

Brochure of IGT, "Top Dollar S-Plus Limited," published in the year 1998 on or before December thereof.
Brochure of IGT, "Totem Pole," written by IGT, available in the year 1997, on or before December thereof.
Brochure of IGT, "Wheel of Fortune," published in the year 1998 on or before December thereof.
Brochure of Konami, "Pele Hawaiian Goddess," retrieved from the Internet: <http://www.konamigaming.com/index.php?option=com__vscatalog&cat=26&product=193&Itemid=42> on Oct. 7, 2008 and available on or before Jul. 7, 2008.
Brochure of WMS Gaming Inc., "Meet the Next Generation of Monopoly Slot Machines from WMS Gaming!" published by Hasbro, Inc. in the year 1999 on or before December thereof.
Brochure of WMS Gaming Inc., "Monopoly Chairman of the Board," published by Hasbro, Inc. in the year 1999 on or before December thereof.
Brochure of WMS Gaming Inc., "Monopoly Once Around," published by Hasbro, Inc. in the year 1998 on or before December thereof.
Brochure of WMS Gaming Inc., "Monopoly Reel Estate," published by Hasbro, Inc. in the year 1998 on or before December thereof.
Brochure of WMS Gaming Inc., "Movers & Shakers," published by Hasbro, Inc. in the year 2000 on or before December thereof.
Cash Chameleon Brochure, written by Aristocrat, published in the year 2000 on or before October thereof.
Chutes and Ladders CD-ROM Game, Hasbro Interactive, Inc., available in the year 1999 on or before December thereof.
Cliff Hangers article web page http://geocities.com/TelevisionCity/stage/9433/cliffhangers.html, printed on Mar. 21, 2001.
Cliff Hangers Bonus and Plinko Bonus Advertisement published prior to Sep. 9, 2003.
Definition of Pitch, Merriam-Webster's Collegiate Dictionary, Tenth Edition, p. 886, available in the year 1999 on or before December thereof.
Description of Accelerated Credit Roll-Up in Gaming Machines written by IGT, available in the year 1999 on or before December thereof.
Description of Action Prompts in Gaming Machines, written by IGT, available in the year 1999 on or before December thereof.
Description of Animating Symbol Feature in Gaming Machines, available in the year 2000 on or before December thereof.
Description of Last Sound in Credit Roll-Up in Gaming Machines written by IGT, available in the year 2000 on or before December thereof.
Description of Lighting Features in Gaming Machines, written by IGT, available in the year 1999 on or before December thereof.
Description of Maximum Wager Sound and Bet Sounds in Gaming Devices written by IGT, available in the year 2000 on or before December thereof.
Description of Payout Sound Feature in Gaming Machine written by IGT, available in the year 1999 on or before December thereof.
Description of Progressive Sound Feature in Pinball and Video Games written by IGT, available in the year 1999 on or before December thereof.
Description of Sound Effects in Gaming Devices written by IGT, available in the year 2000 on or before December thereof.
Description of Sound Feature in Totem Pole™ Gaming Machine written by IGT, available in the year 1997 on or before December thereof.
Description of Tempo Change in Gaming Machines written by IGT, available in the year 2000 on or before December thereof.
Description of Verbal Wager Feature in "Dick Clark" Gaming Machine written by IGT, available in the year 2000 on or before December thereof.
Description of Volume Control Functions in Gaming Machines written by IGT, available in the year 1999 on or before December thereof.
Jazzy Jackpots Advertisements written by Atronic, published in 2000, on or before December thereof.
Jazzy Jackpots Article written by Strictly Slots, published in 2001, on or before March thereof.
MIDI Media Adaptation Layer for IEEE-1394, published by the Association of Musical Electronics Industry in Tokyo, Japan and The MIDI Manufacturers Association in Los Angeles, California, Nov. 30, 2000, pp. 1-17.
Press Release by Ian Fried of CNET News.com, "Microsoft Releases XP for Slot Machines," file://C:Window...\Microsoft releases XP for slot machines—Tech News—CNET.com.htm., Nov. 28, 2001, pp. 1-2.
Press Release, "WMS Gaming's Monopoly Slot Machines Named 1998's Most Innovative Gaming Product at the American Gaming, Lodging and Leisure Summit," published by WMS Gaming Inc. on Jan. 13, 1999.
Screen Shot and Description by IGT of "Free Spins Bonus (Elephant King)" written by IGT, published in 1999, on or before October thereof.
Screen Shots of "Race Car Bonus Feature" written by IGT, available in the year 1998 on or before December thereof.
Slots 2003, part one, written by Melissa Raimondi, published Jan. 2003.
The Java™ Tutorial, "What Can Java Technology Do?" http://java.sun.com/docs/books/tutorial/getStarted/i.../definition.htm, Oct. 16, 2000, pp. 1-2.
The MIDI File Format, http://crystal.capana.org.au/ghansper/midi__introduction/midi__file__format.html, Dec. 28, 2001, pp. 1-10.
The Price is Right Plinko written by Strictly Slots, published in 2001, on or before December thereof.
Tutorial on MIDI and Music Synthesis MIDI Manufacturers Association, 1995-2001 [online] [printed on Mar. 13, 2007]. Retrieved from the Internet at <URL: www.midi.org/about-midi/tutorial/tutor.shtml>.

* cited by examiner

FIG. 4

120

112

| NOTABLE SYMBOL/ COMBINATION 104 | AUDIBLE INDICATOR 114 | GRAPHICAL INDICATOR 116 |
|---|---|---|
| NOTABLE SYMBOL A | SOUND A | GRAPHICAL INDICATOR A |
| NOTABLE SYMBOL B | SOUND B | GRAPHICAL INDICATOR B |
| NOTABLE SYMBOL C | SOUND C | GRAPHICAL INDICATOR C |
| NOTABLE SYMBOL COMBINATION D | SOUND D | GRAPHICAL INDICATOR D |

EXAMPLE POSITIONS OF ONE REEL WHILE SPINNING

EXAMPLE POSITIONS OF ONE REEL SPUN AND STOPPED

EXAMPLE POSITIONS OF ONE REEL WHILE SPINNING

GAMING SYSTEM AND METHOD PROVIDING INDICATION OF NOTABLE SYMBOLS INCLUDING AUDIBLE INDICATION

CROSS-REFERENCE TO RELATED APPLICATIONS

This application is related to the following commonly-owned co-pending patent applications: U.S. patent application Ser. No. 10/889,507 filed on Jul. 12, 2004; U.S. patent application Ser. No. 10/659,093 filed on Sep. 9, 2003; U.S. patent application Ser. No. 10/953,123 filed on Sep. 28, 2004; U.S. patent application Ser. No. 10/826,465 filed on Apr. 16, 2004; U.S. patent application Ser. No. 10/841,014 filed on May 7, 2004; U.S. patent application Ser. No. 11/841,315 filed on Aug. 20, 2007; U.S. patent application Ser. No. 09/978,795 filed on Oct. 15, 2001; U.S. patent application Ser. No. 10/238,255 filed on Sep. 10, 2002; U.S. patent application Ser. No. 10/658,997 filed on Sep. 9, 2003; U.S. patent application Ser. No. 11/530,759 filed on Sep. 11, 2006; and U.S. patent application Ser. No. 10/655,416 filed on Sep. 4, 2003.

BACKGROUND

Known slot machines have special reel symbols, such as wild symbols and bonus triggering symbols. While the reels spin, it can be difficult for certain players to see or detect the special symbols because of the speed of the spinning reels. Consequently, during the spin of the reels, the player can lack information about the occurrence or appearance of the special symbols. This lack of information can be a disadvantage or frustration to the gaming experience.

Other known slot machines play sounds when certain symbols on the reels pass a payline. Every time such symbols pass the payline, a sound is played. Consequently, during the spin of the reels, the player can be overwhelmed by many sounds and it can be difficult for the player to recognize which symbol relates to which sound. This overload of information can be a disadvantage or frustration to players.

Therefore, there is a need to overcome or lessen the effects of such disadvantages. Also, there is a need to increase the amount of information provided to players of gaming devices.

SUMMARY

The gaming device and method disclosed herein produces an indication when at least one special or notable symbol, including, without limitation, a wild symbol, a bonus symbol, a symbol stack, or a stacked symbol, appears while at least one reel is spinning. The indication distinguishes the notable symbol from the other symbols on the reel. During a play of a game, the gaming device causes at least one reel, and preferably a plurality of reels, to spin. As the reel spins, a plurality of symbols associated with the reel move into and out of a symbol display region. If the notable symbol appears within the symbol display region while the reel is spinning, the gaming device produces an indication associated with the notable symbol. The gaming device processor maintains or continues the indication of the notable symbol as the notable symbol moves within the symbol display region during the spinning of the reel.

In one embodiment, a plurality of notable symbols are associated with one reel. In another embodiment, a plurality of notable symbols are associated with a plurality of reels so that different notable symbols are associated with different reels. In one embodiment, the gaming device associates a plurality of different indications with a plurality of different notable symbols. That is, the gaming device is configured to produce different indications for different notable symbols. For example, the gaming device associates a first notable symbol with a first indication, such as a first sound or color, and associates a second, different notable symbol with a second, different indication, such as a second sound or color. In different embodiments, the indications include audible indications, graphical indications, or a combination of audible and graphical indications. In one embodiment, one graphical indication includes changing the spinning speed of the reel associated with the notable symbol.

In one embodiment, the gaming device indicates the notable symbol differently when the notable symbol appears within the symbol display region: (i) while the at least one reel is spinning, and (ii) after the at least one reel stops. In one embodiment, when the at least one reel stops, the first indication also stops. In one embodiment, if the notable symbol is displayed within the symbol display region when the at least one reel stops, the gaming device changes the first indication to a second, different indication. For example, the gaming device can highlight the notable symbol with a red color when the notable symbol appears within the symbol display region while the at least one reel is spinning. If the at least one reel stops, and the notable symbol is displayed within the symbol display region, the gaming device can highlight the notable symbol with a different color, such as yellow.

In one embodiment, the indication of the notable symbols occurs: (a) independent of any game outcome; and (b) independent of the location of the win line or pay line on the reels. For example, the gaming device automatically produces the audio or visual indication whenever a notable symbol appears at the top region of the reel window, regardless of whether the win line or pay line is located at such region.

The indication of the notable symbols assists in distinguishing the notable symbols from the other symbols, thereby providing more information to the player about the occurrence of the notable symbols.

Additional features and advantages are described herein, and will be apparent from the following Detailed Description and the figures.

BRIEF DESCRIPTION OF THE FIGURES

FIG. 4 is a chart illustrating a plurality of symbols associated with a plurality of possible indicators, such as audible indicators and graphical or visual indicators, in accordance with one embodiment of the gaming system disclosed herein.

DETAILED DESCRIPTION

The present disclosure may be implemented in various configurations for gaming machines, gaming devices, or gaming systems, including but not limited to: (1) a dedicated gaming machine, gaming device, or gaming systems wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
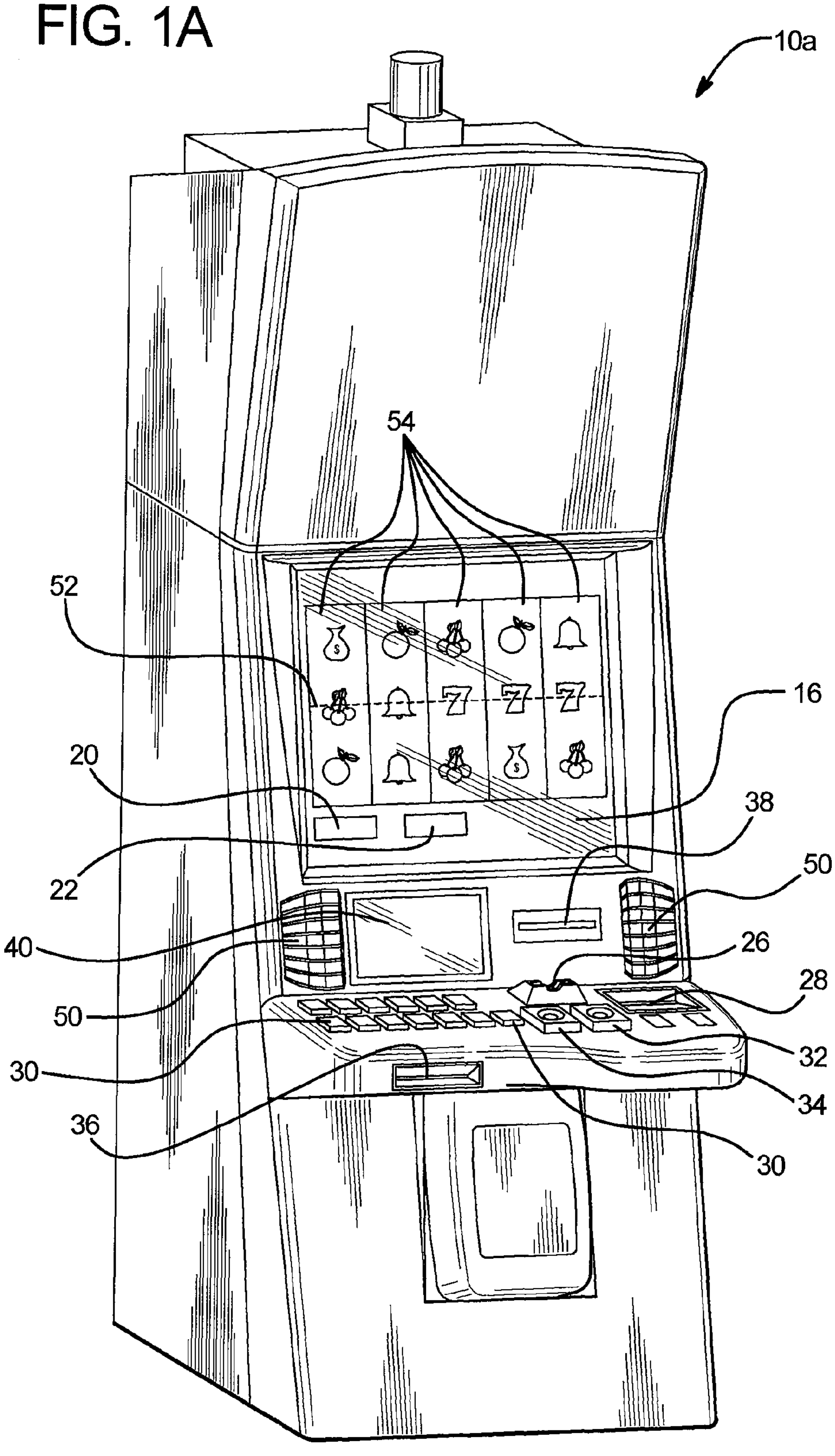
FIGS. 1A and 1B are perspective views of example alternative embodiments of the gaming device of the present disclosure.
Figure 1B:
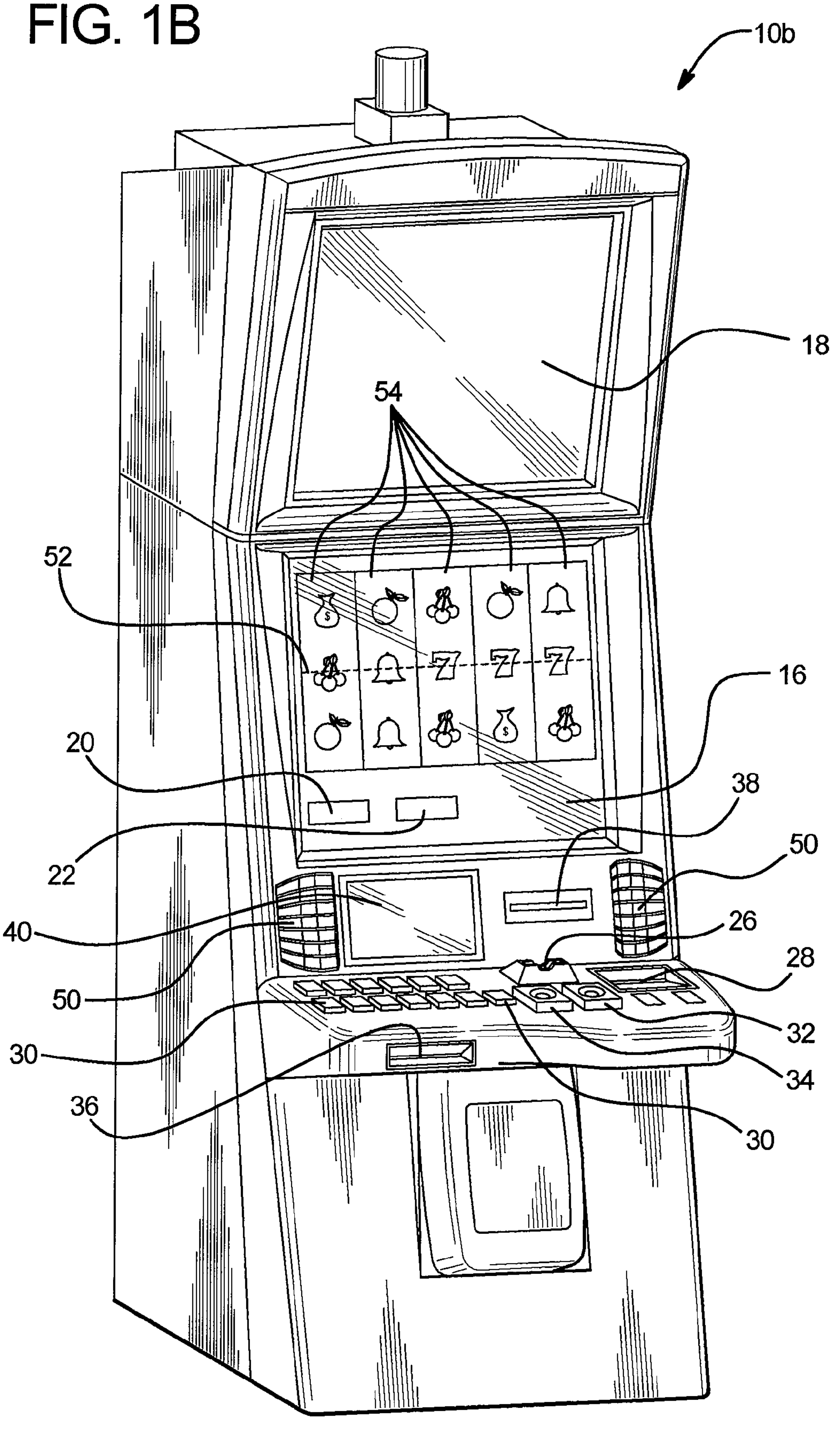

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
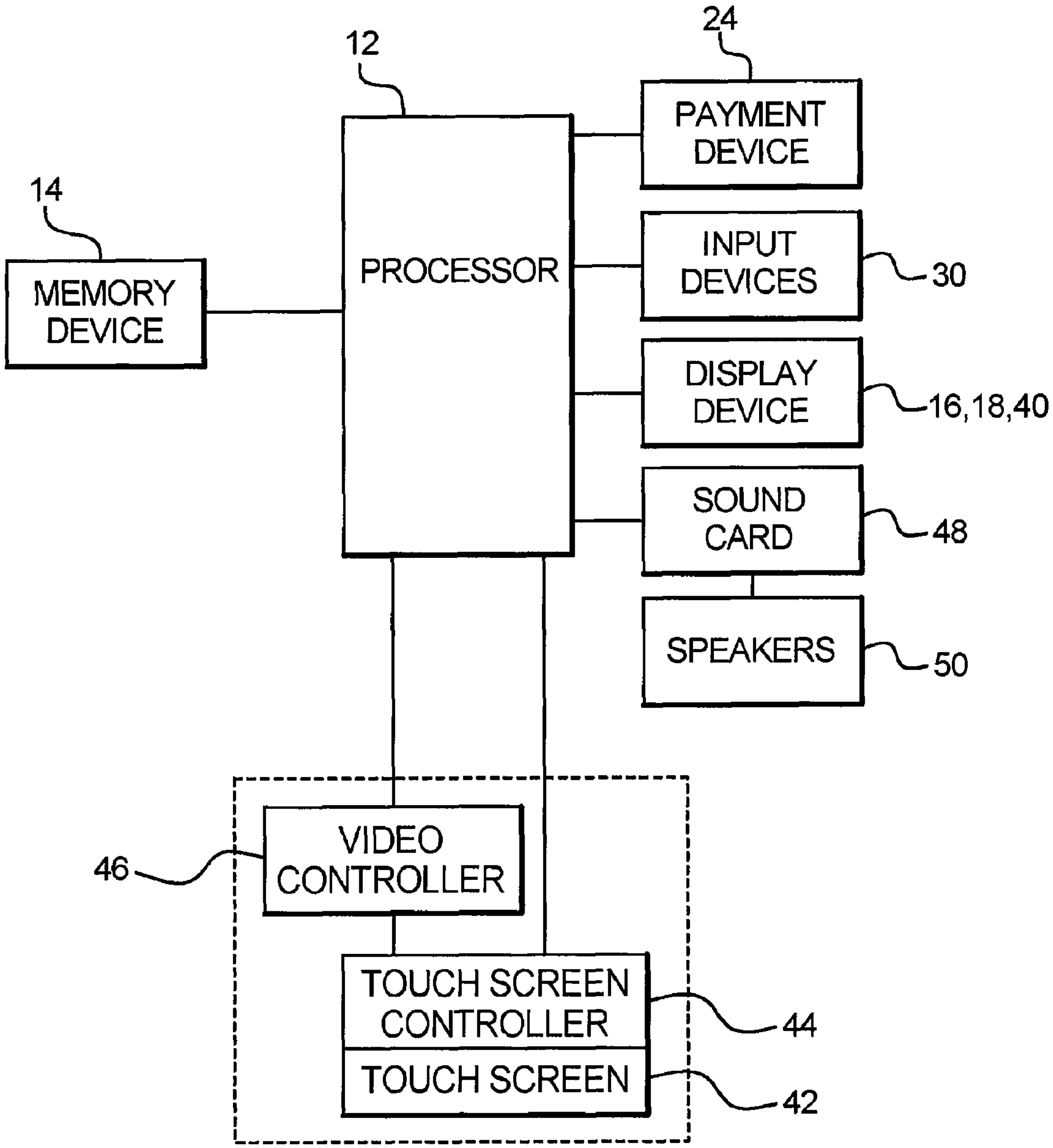
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data), and other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
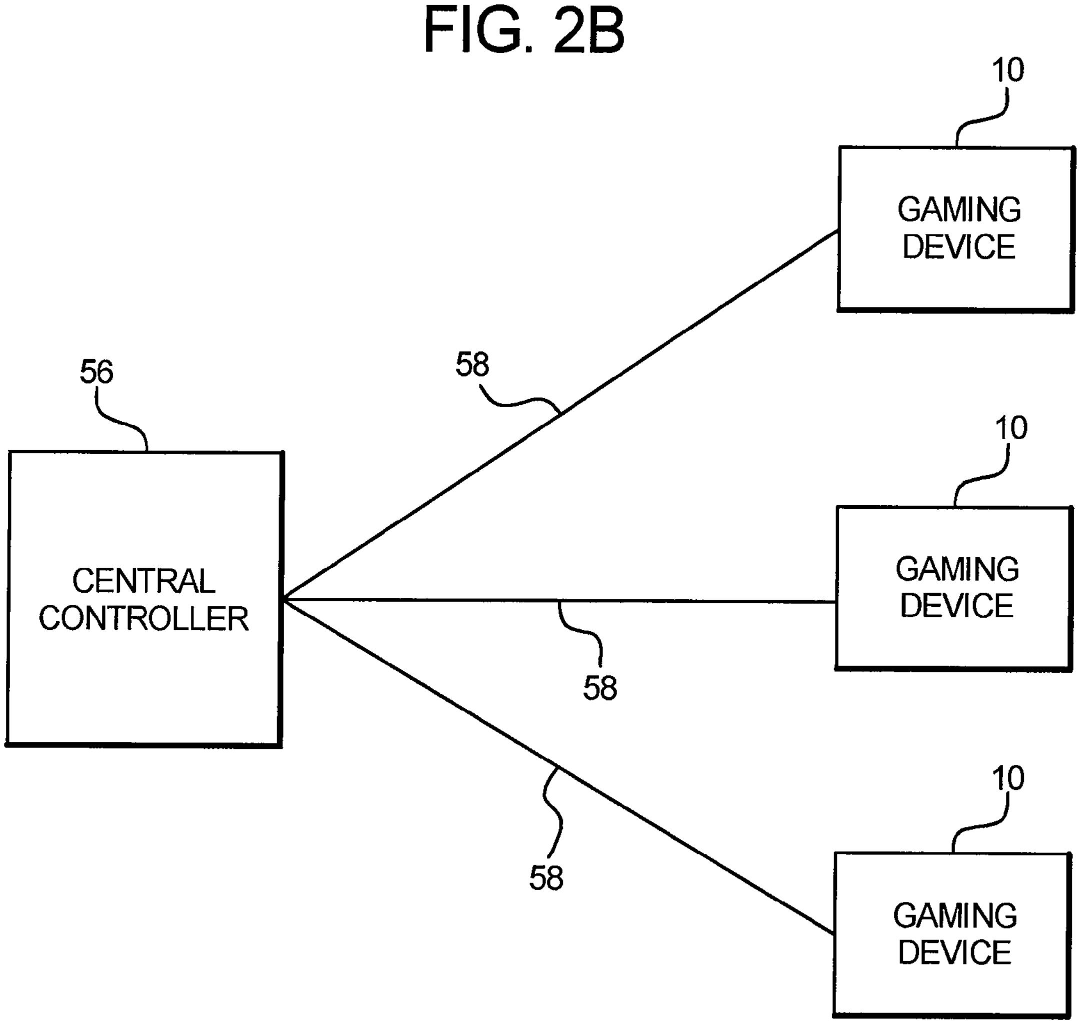
FIG. 2B is a schematic block diagram of one embodiment of a gaming system network configuration including a plurality of gaming devices disclosed herein.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno, or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables, different wager denominations or different themes. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Indication of Notable Symbols

Figure 3:
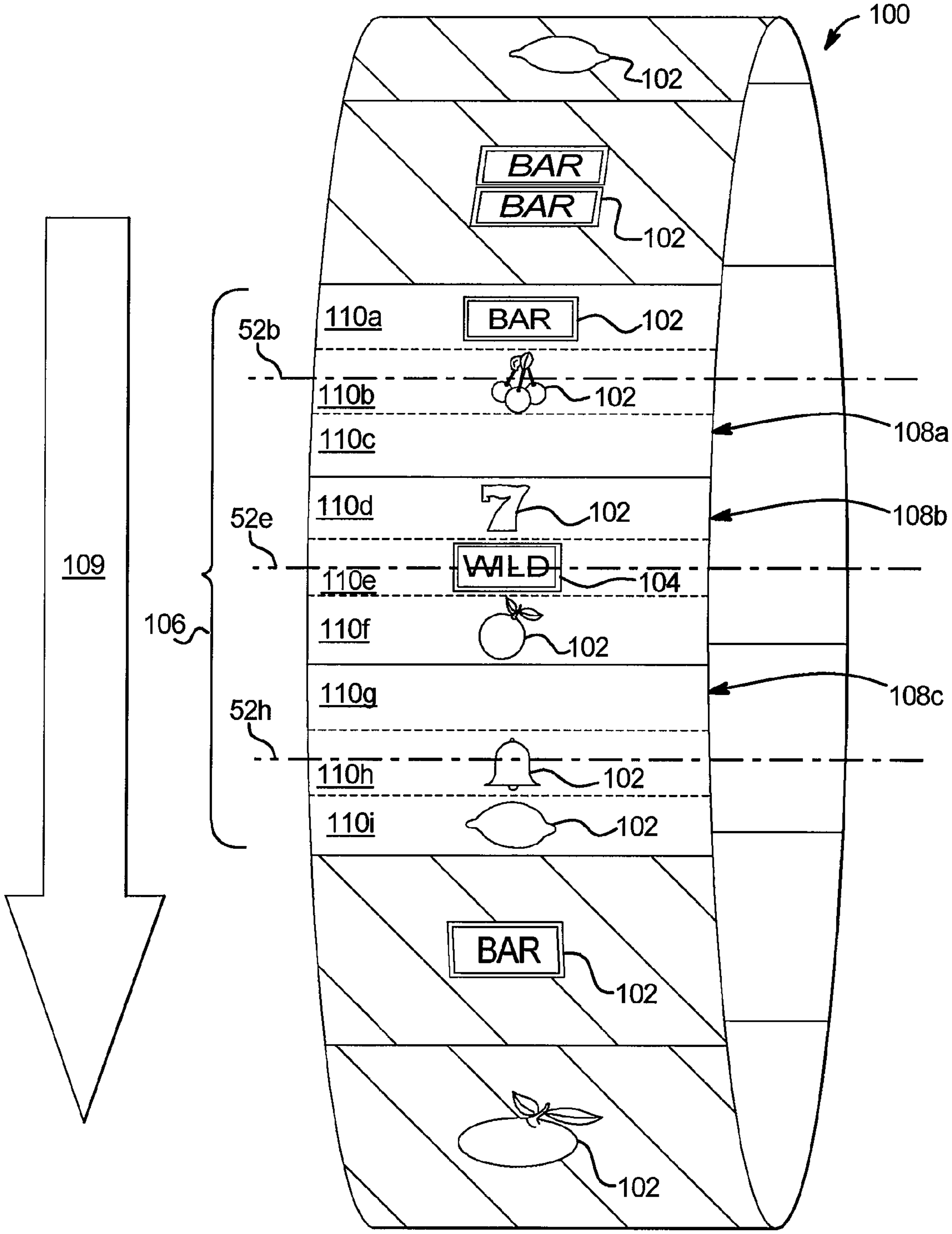
FIG. 3 is a perspective view of one embodiment of a reel for one of the gaming devices disclosed herein.

Referring to FIGS. 1A, 1B and 3, the gaming device 10, in one embodiment, includes at least one reel 54 and preferably a plurality of reels 54 as described above. In the example illustrated in FIG. 3, the reel 54 includes a reel strip 100. The reel strip 100 is associated with a plurality of symbols or indicia 102, such as bells, hearts, fruits, numbers, letters, bars, blank symbols, null symbols or other images.

In the embodiment in which the reel 54 is in physical or mechanical form, the reel strip 100 is in physical or mechanical form. In such embodiment, the physical strip 100 is a chain of symbols painted on, adhered to, printed on or otherwise marked on a reel frame or cylindrical shaped reel support (not shown) of the reel 54 or on a decal attached to the frame or support of the reel 54. In another embodiment, the physical reel strip has a physical structure, and such reel strip is coupled to the reel frame or support. In the embodiment in which the reel 54 is in video, virtual or simulated form, the reel strip 100 is also in video, virtual or simulated form. In such embodiment, the simulated reel strip 100 is a computer-generated graphical representation displayed by the display device 16. In one embodiment, the reel strip 100 (whether in physical or simulated form) defines a chain of symbols whose ends are connected together in an endless loop so that such symbols have a fixed position relative to each other.

The symbols of the reel strip 100 have a function defined or specified by a paytable or outcome schedule. In one embodiment, the outcome schedule specifies different awards for different symbol combinations which are generated by multiple reels 54 on a payline 52. For example, the outcome schedule may specify that a combination of three of the seven symbols on the payline corresponds to an award of X, and a combination of three cherry symbols on the payline corresponds to an award of Y. Each of these types of symbols plays a role as part of a symbol combination. In one embodiment, the outcome schedule specifies or defines that one or more of the reel symbols is special, in part because it has: (a) a purpose or role other than as part of a symbol combination; or (b) a purpose or role as part of multiple symbol combinations. For example, the outcome schedule may specify a special reel symbol, such as a wild symbol which, when appearing on the payline, can convert a losing symbol combination to a winning symbol combination. If, for example, the reels 54 generate a seven-wild-seven on a payline, such outcome would be treated as a winning seven-seven-seven combination. Another example of a special reel symbol is a bonus symbol which, when generated, triggers a bonus game.

In another embodiment, the reel symbols of the reels 54 include a symbol or symbol combination which is associated with an outcome or other information which may be useful for the player. For example, such an information-related symbol may be a symbol which the outcome schedule links to a relatively high award, such as a jackpot or a progressive award. Another such information-related symbol may, for example, be a terminating symbol which the outcome schedule links to a game-ending event.

Any type of symbol, including, but not limited to, the special symbols and information-related symbols described above, may be referred to in this disclosure as "notable symbols" or "designated symbols." Combinations of such special symbols and information-related symbols described above may be referred to in this disclosure as "notable symbol combinations" or "designated symbol combinations."

Depending upon the embodiment, the notable symbols 104 and notable symbol combinations can include: (a) a wild symbol, (b) an expanding symbol, (c) a symbol stack such as a plurality or stack of symbols overlying one another at a single reel position), (d) a stack or stacked symbol such as a plurality of spaced apart, like symbols positioned along a vertical axis on a reel), (e) a bonus symbol, or (f) any other suitable symbol or symbol combination. In one embodiment, the notable symbols 104 and notable symbol combinations can include a wild symbol, an expanding symbol, a symbol stack, a stack symbol, a bonus symbol, or any other suitable symbol or symbol combination which is linked to an outcome. In one example of an embodiment, the outcome linked to the notable symbols 104 is relatively important or significant when compared to the outcomes linked to the other symbols 102 and symbol combinations of the reels 54.

Each symbol 102 or 104 is located at a stop or symbol position of the reel strip 100. In one embodiment, a notable expanding symbol (not shown) is configured to expand from an initial stop or symbol position to one or more stop or symbol positions adjacent to the initial position. The notable expanding symbol is configured to expand vertically, horizontally, or along a payline. In one embodiment, a notable symbol stack (not shown) includes a plurality of symbols 102 or 104 layered or stacked at the same stop or symbol position. In one embodiment, the notable symbol stack includes an initially displayed symbol and at least one initially hidden symbol stacked beneath the initially displayed symbol. Upon the occurrence of at least one triggering event, the initially displayed symbol may be removed to reveal one or more of the initially hidden symbols so that one or more different sets of visible symbols appear on the display device.

In one embodiment, illustrated in FIG. 3, the gaming device processor causes at least one reel 54 to spin. The gaming device processor determines whether the notable symbol 104 will appear within a symbol display window or region 106 while the reel 54 is spinning. In one embodiment, such determination is performed when the symbol 104 is outside of the symbol display region 106. Based on the determination, the gaming device processor indicates the appearance of the notable symbol 104 within the symbol display region 106. The indication can include, but is not limited to, any suitable audible indication, any suitable graphical indication, a combination of any suitable audible and graphical indication or any other suitable indication. The gaming device processor maintains or continues the indication of the notable symbol 104 during the time when the notable symbol 104 moves within the symbol display region 106 during the spinning of the reel 54.

The indication of the notable symbol 104 informs the player or players of the gaming device that the notable symbol 104 has appeared and is appearing within the symbol display region 106 while the reel 54 is spinning. In one embodiment, different indications or indicators are associated with different notable symbols 104 so that different indications identify different notable symbols 104.

In a mechanical form, at least one reel 54 is associated with at least one symbol window or symbol display region 106 which displays or reveals a portion of the reel strip 100 of the reel 54 that is visible by the player. In an electromechanical form, a plurality of adjacent, rotatable reels 54 may be displayed by an electronic display of any suitable type. The electronic display is associated with, or constitutes, at least one symbol window or symbol display region 106 which displays a portion of each reel strip 100 of the reels 54. In a video form, the plurality of adjacent, rotatable reels 54 are simulated and displayed by one or more of the display devices, as described above. In one such embodiment, each of the display devices includes, or otherwise is associated with, at least one symbol window or symbol display region 106 that displays portions of each reel strip 100 of the reels 54.

In the example illustrated in FIG. 3, the display device of the gaming device includes at least one symbol display region 106 at which a portion of the reel strip 100 of the reel 54 is visible by a player. In the example illustrated in FIG. 3, the symbol display region 106 displays symbols 102 (e.g., "CHERRY" and "BELL") and a notable symbol 104 (e.g., "WILD") of the reel strip 100 to the player. The portions of the reel strip 100 of the reel 54 which are not visible are diagonally hatched. The diagonal hatching represents the portions of the reel strip 100 which are not displayed within the symbol display region 106. As illustrated in FIG. 3, a plurality of the symbols 102 or 104 of the reel strip 100 are not within the symbol display region 106 and are not displayed to a player of the gaming device.

It should be appreciated that as the reel 54 moves or rotates, such as in the direction indicated by the downward-pointing arrow 109 of FIG. 3, there is a continuous change in the portions of the reel strip 100 which pass through the symbol display region 106. When the reel 54 is rotated, the chain of symbols 102 and 104 move through, and change positions relative to, the symbol display region 106.

In the example illustrated in FIG. 3, the symbol display region 106 is divisible into a plurality of main regions 108*a-c*. The plurality of main regions 108*a-c* are positioned adjacent to one another in a chain-like fashion. In the example illustrated in FIG. 3, the plurality of main regions are divisible into a plurality of sub-regions 110*a*-110*i*. Main region 108*a* is associated with sub-regions 110*a-c*, main region 108*b* is associated with sub-regions 110*d-f*, and main region 108*c* is associated with sub-regions 110*g-i*. The plurality of sub-regions 110*a*-110*i* are positioned adjacent to one another in a chain-like fashion. Each one of the sub-regions 110*a*-110*i* is sized so that at least one of the symbols 102 and 104 is displayable at such sub-region at any one point in time. In one embodiment, each one of the main regions 108*a-c* is sized so that at least one of the symbols 102 and 104 is displayable at such main region at any one point in time.

In one embodiment, at least one payline 52 corresponds to at least one of the sub-regions 110*a* to 110*i*. In the illustrated example, payline 52*b* extends through sub-region 110*b*, payline 52*e* extends through sub-region 110*e*, and payline 52*h* extends through payline 110*h*. Because of the association with a payline, sub-regions 110*b*, 110*e* and 110*h* function as evaluation sub-regions or evaluation positions. The remaining sub-regions 110*a*, 110*c*, 110*d*, 110*f*, 110*g*, and 110*i*, which are not associated with a payline, function as non-evaluation sub-regions or non-evaluation positions. When the reel 54 spins and stops, the gaming device processor evaluates wins, losses or other outcomes based on which symbols 102 and 104 are stopped at the evaluation positions 110*b*, 110*e* and 110*h*. The gaming device processor does not conduct such outcome evaluation at any of the non-evaluation positions 110*a*, 110*c*, 110*d*, 110*f*, 110*g*, and 110*i*. In one embodiment, the gaming device processor conducts such outcome evaluation at the non-evaluation positions 110*a*, 110*c*, 110*d*, 110*f*, 110*g*, and 110*i* to determine any scatter pay arrangements.

In one embodiment, the gaming device processor causes the display device to display one of the symbols 102 or 104 at each of the evaluation positions 110*b*, 110*e* and 110*h*. For example, on a five reel gaming device with three symbols generated in evaluation positions 110*b*, 110*e* and 110*h* on each reel, each symbol would be displayed three times per spin. In another embodiment, the gaming device processor causes the display device to display one of the symbols 102 or 104 at each of the evaluation positions 110*b*, 110*e* and 110*h* and halfway between each of the evaluation positions 110*b*, 110*e* and 110*h*. Such display enhances the appearance of the symbols spinning and is commonly referred to "half-stepping" symbols. In this embodiment, on a five reel gaming device with three symbols generated in evaluation positions 110*b*, 110*e* and 110*h* on each reel, each symbol would be displayed six times per spin. It should be appreciated that half-stepping, quarter-stepping or any other suitable variation could be used to display the symbols 102 or 104. In one embodiment, the gaming device processor causes the display device to display one of the symbols 102 or 104 at each of the sub-regions 110*a*-110*i* for each reel spin. In this embodiment, on a five reel gaming device with three symbols generated in evaluation positions 110*b*, 110*e* and 110*h* on each reel, each symbol would be displayed nine times per spin.

In one embodiment, the gaming device processor determines a position of each symbol 102 or 104 relative to the symbol display region 106. In one embodiment, at least one of the symbols 102 or 104 are displayable in each of the sub-regions 110*a* to 110*i* of the symbol display region 106. In the example illustrated in FIG. 3, a "BAR" symbols, a "CHERRY" symbol, a blank symbol, a "SEVEN" symbol, a "WILD" symbol, an "ORANGE" symbol, a blank symbol, a "BELL" symbol and a "LEMON" symbol are displayed in sub-regions 110*a-i*, respectively.

In one embodiment, the gaming device processor displays a first one of the symbols 102 or 104 at sub-region 110*a* of the symbol display region 106. As the reel spins, the first symbol moves from non-evaluation sub-region 110*a* to evaluation sub-region 110*b* within the symbol display region 106. As the reel continues to spin, the first symbol moves from evaluation sub-region 110*b* to non-evaluation sub-region 110*c* within the symbol display region 106. In one embodiment, the movement of the first symbol continues within the symbol display region 106 until the reel is stopped. When the first symbol passes non-evaluation sub-region 110*i*, the first symbol continues moving relative to the symbol display region 106 while not being visible. In the example illustrated in FIG. 3, once a symbol moves past the non-evaluation sub-region 110*i*, in the direction of the arrow 109, the symbol is hidden from view.

In one embodiment, the indication of the notable symbols (whether audio, visual or audiovisual) occurs independent of one, a plurality of, or all of the following: (a) any win, loss or other game outcome; (b) the location of any win line or payline on the reels; and (c) any active win line or payline on the reels. For example, the gaming device automatically produces the indication whenever a notable symbol appears in upper most sub-region of visible position of the reel window 106, which, in the illustrated example, is sub-region 110*a*. In such embodiment, the gaming device produces such indication regardless of whether the win line or payline passes through sub-region 110*a*.

In some embodiments, the gaming device includes wagering logic or elements other than paylines which specify opportunities for outcomes on one or more reels 54. For example, the gaming device processor or the player can specify one or more designated symbol positions of one or more reels 54 to be used evaluate whether one or more symbols 102 or 104 appear at such positions. In such embodiment, such designated symbol positions function as evaluation positions. The gaming device processor performs the indication of the notable symbols (whether audio, visual or audiovisual) regardless of whether the notable symbols stop at such evaluation positions.

In one embodiment, the gaming device awards prizes after the reels 54 stop spinning if specified types or configurations of the symbols 102 or 104 are generated on an active payline 52 or are otherwise generated in a winning pattern, occur on the requisite number of adjacent reels or occur in a scatter pay arrangement.

Referring to FIG. 4, the chart 120 shows a plurality of notable symbols 104 associated with a plurality of different identifiers, or indicators 112. Notable symbol A is associated with: (a) an audible indicator 114, such as sound A; and (b) a graphical indicator 116, such as graphical indicator A. Notable symbol B is associated with: (a) an audible indicator 114, such as sound B; and (b) a graphical indicator 116, such as graphical indicator B. Notable symbol C is associated with: (a) an audible indicator 114, such as sound C; and (b) a graphical indicator 116, such as graphical indicator C. Notable symbol combination D is associated with: (a) an audible indicator 114, such as sound D; and (b) a graphical indicator 116, such as graphical indicator D. In one embodiment, no symbols 102 other than the notable symbols 104 are associated with either an audible indicator 114 or a graphical indicator 116.

In one embodiment, at least one audible indicator 114 or at least one graphical indicator 116 is associated with each notable symbol 104 based on a random determination performed by the gaming device. It should be appreciated that, in different embodiments, the audible indicator 114 or the graphical indicator 116 is determined based on a random determination by the central controller, determined based on one or more side wagers placed, determined based on the player's primary game wager, determined based on time (such as the time of day), determined by the game operator or gaming establishment or determined based on any other suitable method or criteria.

In one embodiment, the audible indicator 114 or the graphical indicator 116 is determined based on the player's status or ranking (such as determined through a player tracking system). For example, a notable "WILD" symbol is associated with a first graphical indicator 116, such as a blue glow frame, which substantially surrounds the notable "WILD" symbol, for players having a bronze status or ranking. For players having a gold status or ranking, the notable "WILD" symbol is associated with a second, different graphical indicator 116, such as a blinking or flashing green glow frame, which substantially surrounds the designated "WILD" symbol. By providing different identifiers or indicators for different player statuses or rankings, the gaming device can indicate identifying information depending upon which player is playing the game.

In one embodiment, the audible indicators 114 include different sound recordings, musical pieces, electronic sound files or music, such as different songs or notes. In one embodiment, the audible indicators 114 include different pitches of the same sound. In another embodiment, the audible indicators 114 include the same or different pitches of different sounds. In one embodiment, the audible indicators 114 include different tempos of the same sound. In another embodiment, the audible indicators 114 include the same or different tempos of different sounds. Referring back to FIG. 4, in one embodiment the audible indicators A, B and C differ from each other by one or more sound characteristics.

In one embodiment, the different notable symbols correspond to different audible indicators. In another embodiment, different groups of notable symbols correspond to different audible indicators. Each audible indicator functions as an audio signature for the corresponding notable symbol or group of notable symbols, such as the symbol stack or the stacked symbols described above. For example, a notable "WILD" symbol may correspond to the trumpet sound of an elephant and a notable bonus symbol may correspond to a piano sound. In another example, a group of notable "WILD" symbols, such as a stacked "WILD" symbol, may correspond to the roaring sound of a lion. As such notable symbols roll into view, the gaming device plays or generates these sounds. These sounds distinguish the notable symbols from the other symbols. As a result, these sounds alert the player that such notable symbols are in view without requiring the player to see or look at the notable symbols.

In one embodiment, at least one of the audible indicators 114 changes while the associated notable symbol moves within the symbol display region 106. For example, sound A changes in frequency or pitch while the notable symbol A moves downward from sub-region 110*a* to sub-region 110*i* of the symbol display region 106. In one embodiment, the change in sound simulates the Doppler effect experienced when a fast moving object passes a bystander. In one embodiment, the gaming device processor modifies any suitable characteristic of the audible indicator 114, such as pitch or tempo, while one of the notable symbols moves downward or upward within the symbol display region 106.

In one embodiment, the graphical indicators 116 include different colors, such as red, blue or green. In one embodiment, the graphical indicators 116 include different colors or types of highlighting. In another embodiment, the graphical indicators 116 include at least one glow frame which substantially surrounds the notable symbol 104. In one embodiment, the glow frame associated with each different notable symbol 104 is a different color. In one embodiment, the graphical indicators 114 include flashing or blinking in different colors or at different rates for each different notable symbol 104. Depending upon the embodiment, the graphical indicators can include different colors, shades, intensity, sprites, images, symbols, animations or any other suitable graphical or visual characteristics.

In one embodiment, at least one of the graphical indicators 114 changes while the associated notable symbol moves within the symbol display region 106. For example, graphical indicator A changes colors one or more times as the notable symbol A moves downward from sub-region 110*a* to sub-region 110*i* within the symbol display region 106. In one embodiment, the gaming device processor modifies any suitable characteristic of the graphical indicator 116, such as color or flash rate, as one of the notable symbols moves downward or upward within the symbol display region 106.

Figure 5A:
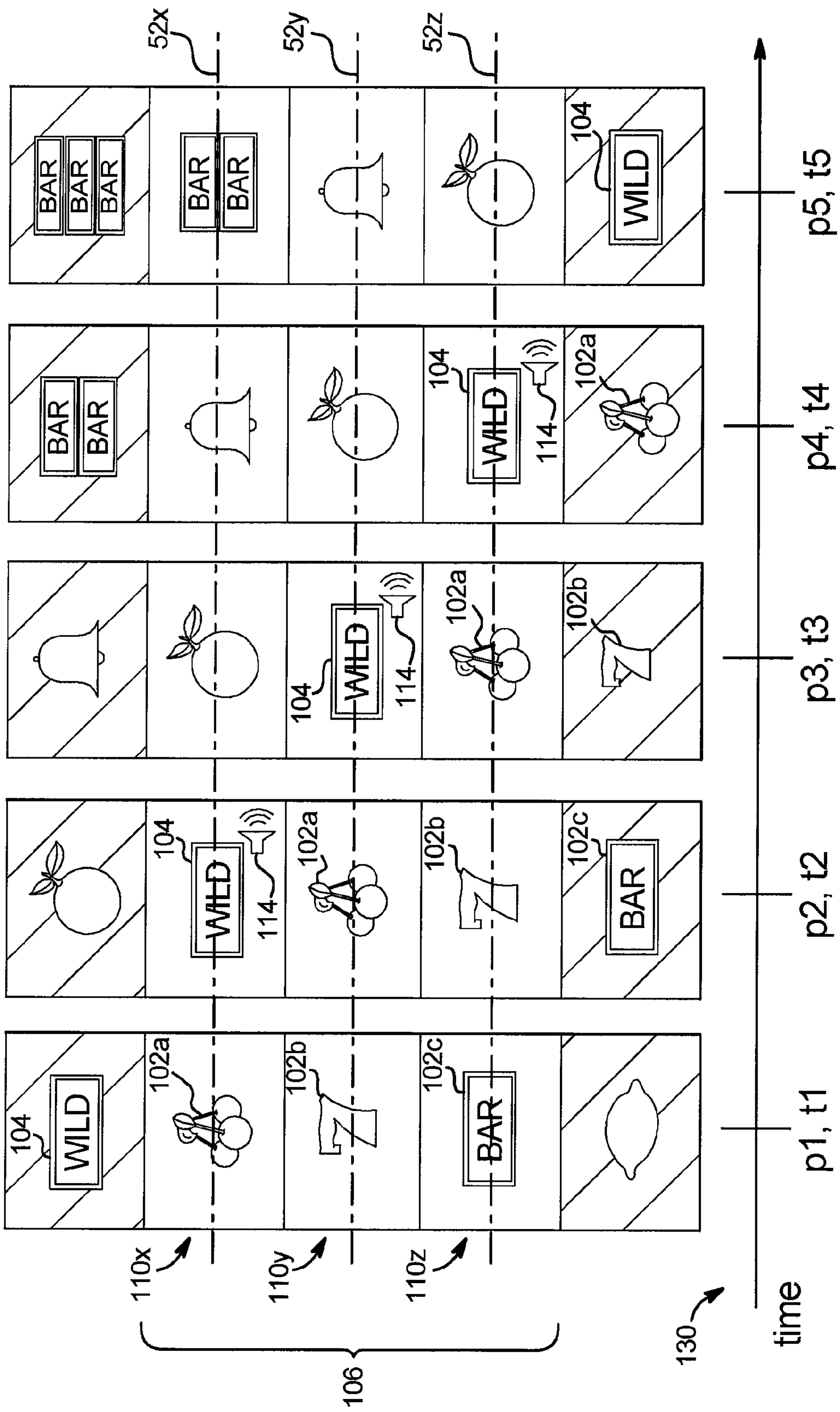
FIG. 5A is a schematic diagram illustrating example positions of one reel of one of the gaming devices as the reel spins over time in accordance with one embodiment of the gaming system disclosed herein, wherein at least one audible indicator is associated with one of the symbols.

Referring now to FIG. 5A, different example positions or "snap-shots" of one reel 54 illustrate the different positions of the reel 54 as time elapses. Each "snap-shot" illustrates the position of the reel 54 at one point in time on the timeline 130. The gaming device processor causes the reel 54 to spin. In one embodiment, the gaming device processor provides a reel spinning sound, such as "tick-tick-tick . . . " or another suitable reel spinning sound along with suitable background music while the reel 54 spins.

As the reel 54 spins, the symbols 102 and 104 of the reel strip 100 pass through the symbol display region 106. At any one point in time, each symbol 102 and 104 of the reel strip 100 occupies one of the sub-regions 110 of the symbol display region 106. As illustrated, symbol 102*a* occupies sub-region 110*x*, symbol 102*b* occupies sub-region 110*y*, and symbol 102*c* occupies sub-region 110*z*. In the example illustrated in FIG. 3, the symbol display region 106 is divided into sub-regions 110*a-i* (FIG. 3) while in the example illustrated in FIG. 5A, the symbol display region 106 is divided into sub-regions 110*x-z* (FIG. 5A). It should be appreciated that the symbol display region 106 can be divided into any number of sub-regions 110 and that each symbol 102 and 104 could be sized to occupy any number of sub-regions 110 within the symbol display region 106.

In the example illustrated in FIG. 5A, the notable symbol 104 is a "WILD" symbol. At a first point in time t1 during the spin of the reel 54, the notable "WILD" symbol 104 is positioned at a first position p1. The notable "WILD" symbol 104 is diagonally hatched to represent that the notable "WILD" symbol 104 is not visible or displayed within the symbol display region 106 when reel 54 has the first position p1.

At a second point in time t2 during the spin of the reel 54, the reel 54 has a lower position p2. In the lower position p2, the notable "WILD" symbol 104 occupies sub-region 110*x* of the symbol display region 106, symbol 102*a* occupies sub-region 110*y* of the symbol display region 106, and symbol 102*b* occupies sub-region 110*z* of the symbol display region 106. When part or all of the notable "WILD" symbol 104 appears within symbol display window or region 106, the gaming device processor provides or generates one of the audible indicators 114 described above, regardless of the location of the paylines 52*x*, 52*y* or 52*z* and the direction of the reel spin. In one embodiment, the gaming device processor provides or generates one of the audible indicators 114 described above when part or all of the notable "WILD" symbol 104 appears within the sub-region 110*x* of the symbol display region 106. Depending upon the embodiment, the audible indicators 114 described above could immediately precede or substantially coincide with the appearance of the notable "WILD" symbol 104 within the sub-region 110*x*.

At a third point in time t3 during the spin of the reel 54, the reel 54 has a third position p3. In the third position p3, the notable "WILD" symbol 104 occupies sub-region 110*y* of the symbol display region 106 and symbol 102*a* occupies sub-region 110*z* of the symbol display region 106. The gaming device processor continues the audible indicator 114 as the notable "WILD" symbol 104 moves toward sub-region 110*z* of the symbol display region 106.

At a fourth point in time t4 during the spin of the reel 54, the reel has a fourth position p4. In the fourth position p4, the notable "WILD" symbol 104 occupies sub-region 110*z* of the symbol display region 106. The gaming device processor continues the audible indicator 114 for as long as part or all of the notable "WILD" symbol 104 appears within the sub-region 110*z* of the symbol display region 106.

At a fifth point in time t5 during the spin of the reel 54, the reel has a fifth position p5. In the fifth position p5, the notable "WILD" symbol 104 is outside of the symbol display region 106. The notable "WILD" symbol 104 is diagonally hatched to represent that the notable "WILD" symbol 104 is not visible or displayed within the symbol display region 106 when at the fifth position p5. The gaming device processor ends the audible indicator 114 when the reel 54 reaches the fifth position p5 because the notable "WILD" symbol 104 is no longer visible or displayed within one of the sub-regions 110*x*, 110*y* or 110*z* of the symbol display region 106. In different embodiments, the gaming device processor ends the audible indicator 114 before, at substantially the same time as, or after the reel 54 reaches the fifth position p5.

Figure 5B:
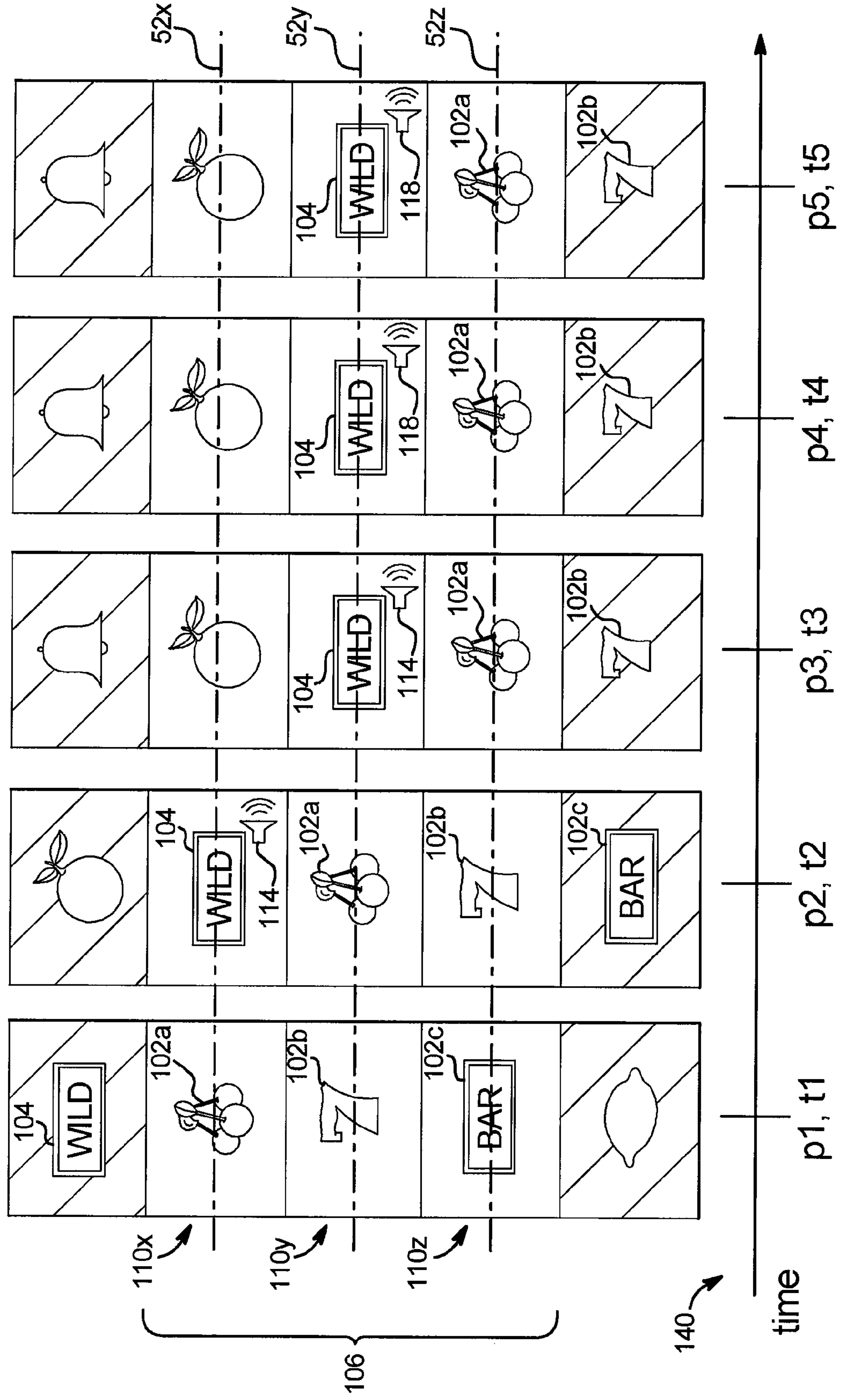
FIG. 5B is a schematic diagram illustrating example positions of one reel of one of the gaming devices as the reel spins and stops over time in accordance with one embodiment of the disclosed gaming system, wherein at least one audible indicator is associated with one of the symbols.

Referring now to FIG. 5B, different example positions of one reel 54 illustrate the positions of the reel 54 at different points in time on the timeline 140. Timeline 140 differs from timeline 130 of FIG. 5A in that the notable "WILD" symbol 104 has stopped in the third position p3 at the third point in time during the spin of the reel 54. As illustrated in FIG. 5B, the reel 54 remains stopped in the third position p3 for the third, fourth and fifth points in time t3 to t5.

Timeline 140 shows that the gaming device processor provides at least one of the audible indicators 114 when reel 54 moves to the second position p2 at the second point in time t2. The gaming device processor continues the audible indicator 114 as the notable "WILD" symbol 104 moves toward occupying sub-region 110*y* at the third point in time t3.

At a fourth point in time t4 of timeline 140, the notable "WILD" symbol 104 remains at the sub-region 110*y*. The gaming device processor changes the audible indicator from a first audible indicator 114 to a second, different audible indicator 118. In one embodiment, the first audible indicator 114 is a sound or note and the second, different audible indicator 118 is a modified version of the sound or note. In another embodiment, the first audible indicator 114 is a first sound or note and the second, different audible indicator 118 is a second, different sound or note.

In one embodiment, when the gaming device processor changes from playing one sound or audible indicator to another, the processor can stop the first sound or audible indicator at one point in time and start the second sound or audible indicator at the same point in time (e.g., simultaneously). In one embodiment, the processor can fade-out the first sound or audible indicator and play or fade-in the second sound or audible indicator. Alternatively, the processor can play a transitional sound or note to produce a musical transition from the first sound or audible indicator to the second sound or audible indicator. In one embodiment, when the gaming device processor changes from playing one sound or audible indicator to another, the processor can stop the first sound or audible indicator at one point in time and start the second sound or audible indicator at a different point in time (e.g., sequentially).

At a fifth point in time t5 of timeline 140, the notable "WILD" symbol 104 remains at the sub-region 110*y*. The gaming device processor continues the second, different audible indicator 118. As described above, the gaming device awards prizes after the reel 54 stops spinning if specified types or configurations of the symbols 102 or 104 are generated.

Figure 6:
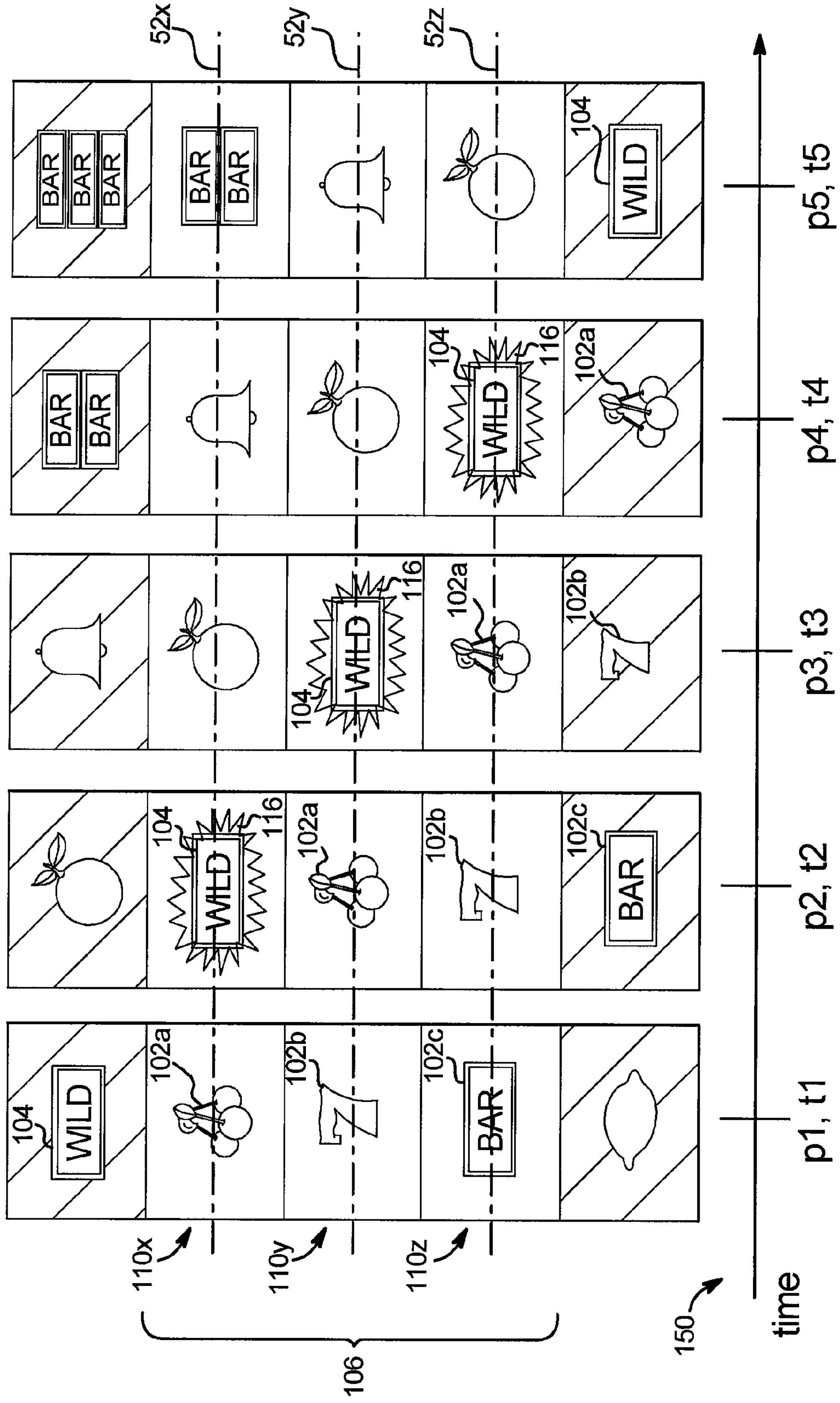
FIG. 6 is a schematic diagram illustrating example positions of one reel of one of the gaming devices as the reel spins over time in accordance with one embodiment of the gaming system disclosed herein, wherein at least one graphical or visual indicator is associated with one of the symbols.

Referring now to FIG. 6, different example positions of one reel 54 illustrate the positions of the reel 54 at different points in time on the timeline 150. Timeline 150 differs from timeline 130 of FIG. 5A in that when one of the notable symbols 104 appears within the symbol display region 106, the gaming device processor provides a graphical indicator 116 of the notable symbol 104 instead of an audible indicator 114. In the example illustrated in FIG. 6, the notable symbol 104 is a "WILD" symbol, and the graphical indicator 116 is an "explosion" symbol having pointed edges. In one embodiment, the "explosion" symbol represents a glow frame or highlighting of any suitable color.

Figure 7:
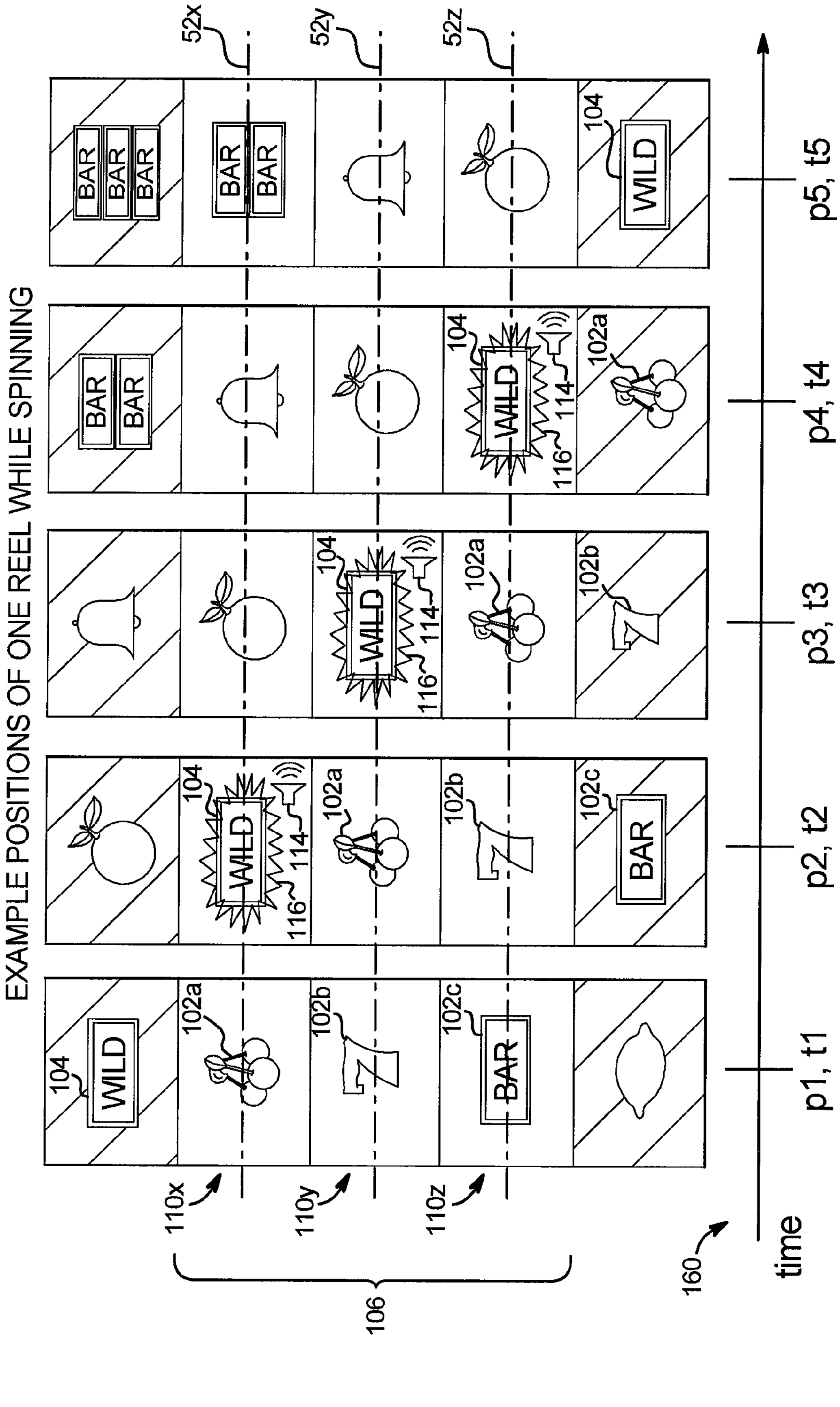
FIG. 7 is a schematic diagram illustrating example positions of one reel of one of the gaming devices as the reel spins over time in accordance with one embodiment of the gaming system disclosed herein, wherein at least one audible indicator and at least one graphical or visual indicator are associated with one of the symbols.

Referring now to FIG. 7, different example positions of one reel 54 are illustrated as the reel 54 spins over a period of time represented by timeline 160. Timeline 160 differs from timeline 130 of FIG. 5A and timeline 150 of FIG. 6 in that when one of the notable symbols 104 appears within the symbol display region 106, the gaming device processor provides or generates both an audible indicator 114 and a graphical indicator 116 associated with the notable symbol 104. In the example illustrated in FIG. 7, the notable symbol 104 is a "WILD" symbol.

In the examples illustrated in FIGS. 5A-7, the gaming device processor automatically starts the performance of the audio, visual or audiovisual indication of the notable symbols when they first appear in the uppermost region of the display window 106. The gaming device processor continues performing such indication while the notable symbols travel downward within the display window 106 regardless of whether the notable symbols pass evaluation positions or non-evaluation positions.

It should be appreciated that one or more notable symbols 104 can appear within the symbol display region 106 at the same time. For example, a first notable symbol and a second notable symbol can be positioned on the reel strip 100 of one reel 54 so that both can appear within the symbol display region 106 at the same time. In another example, a first notable symbol of a first reel 54 and a second notable symbol of a second, different reel 54 can both appear within the symbol display region 106 at the same time.

Figure 8:
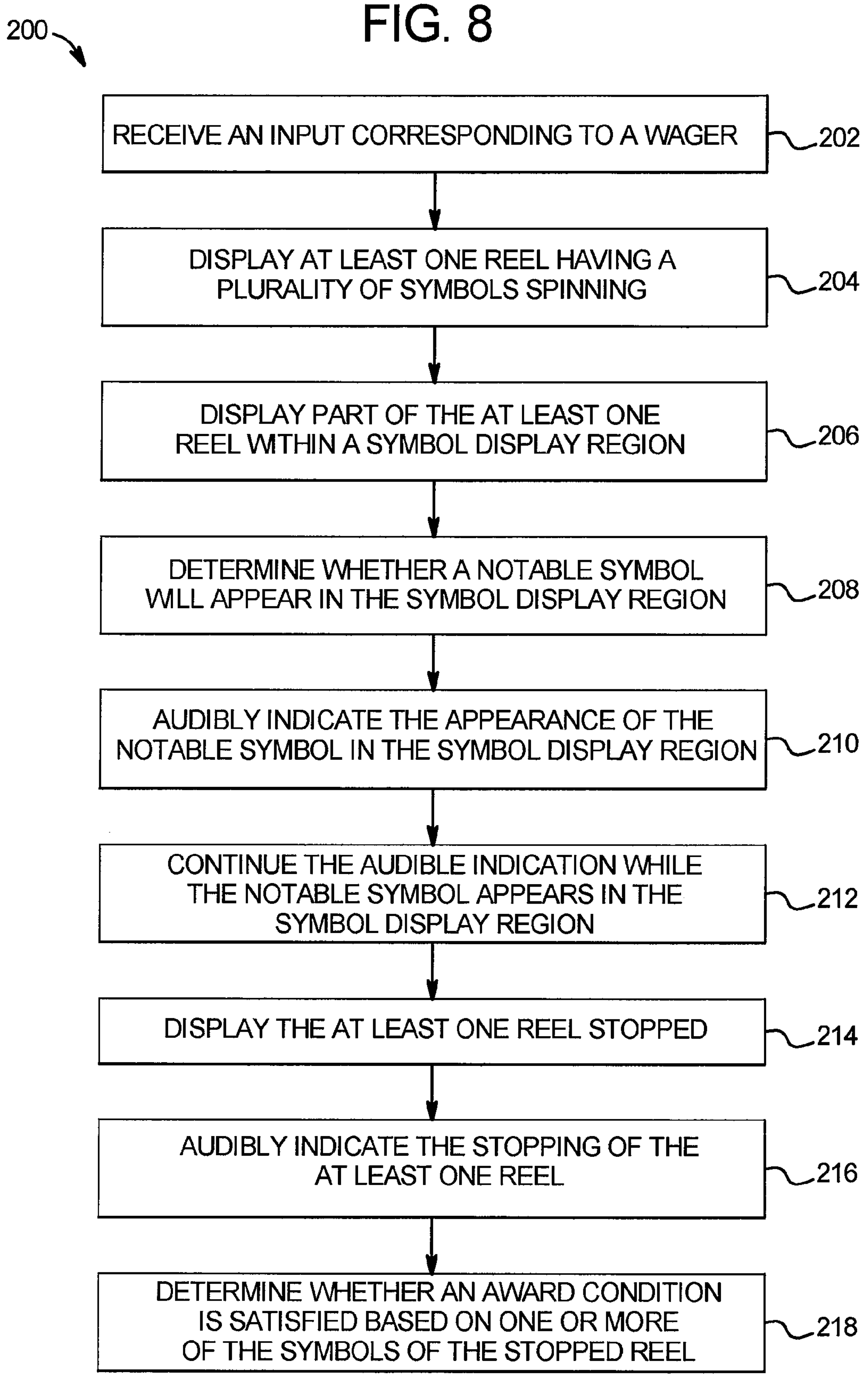
FIG. 8 is a process flow diagram showing one possible flow sequence of one embodiment of the gaming system disclosed herein.

Referring now to FIG. 8, in one embodiment, the process 200 is embodied in one or more software programs stored in one or more memories and executed by one or more processors or controllers. Although the process 200 is described with reference to the flowchart illustrated in FIG. 8, it should be appreciated that other suitable methods of performing the acts or steps associated with process 200 may be used. For example, the order of the blocks may be changed, and one or more of the blocks described may be optional.

The process 200 begins when a player places a wager for a game at one of the gaming devices 10 in the gaming system. As indicated by block 202, the gaming device processor of one of the gaming devices receives an input corresponding to the wager from the player. After receiving the wager, the gaming device initiates a game. In one embodiment, the central server of the gaming system communicates with the gaming device processor of the gaming device to initiate the game. In one embodiment, the game includes at least one reel which has a plurality of symbols and is initiated by spinning the at least one reel. As indicated by block 204, the gaming device displays at least one reel having a plurality of symbols spinning.

As indicated by block 206, the gaming device displays part of the reel within a symbol display region. In one embodiment, the gaming device processor causes the reel to spin. In one embodiment, the gaming device produces a reel spin sound (such as "tick-tick-tick . . . " or another suitable sound which emulates a sound of a spinning reel) while the reel is spinning.

The gaming device processor determines whether a notable symbol will appear in the symbol display region, as indicated by block 208. This determination is performed before the notable symbol reaches the symbol display region. In one embodiment, the gaming device processor determines whether a notable symbol will appear in the symbol display region, as indicated by block 208, before the reel begins to spin. In another embodiment, the gaming device processor determines whether a notable symbol will appear in the symbol display region, as indicated by block 208, while the reel is spinning. In one embodiment, the gaming device processor determines whether a notable symbol will appear in the symbol display region, as indicated by block 208. In one embodiment, the determination whether a notable symbol will appear in the symbol display region occurs regardless of a position of the notable symbol with respect to at least one of the winning lines or paylines.

As indicated by block 210, the gaming device processor indicates the presentation or appearance of the notable symbol in the symbol display region. In one embodiment, the indicator includes: (a) an audible indicator, such as one of the audible indicators 114 described above; (b) a graphical indicator, such as one of the graphical indicators 116 described above; or (c) a combination of an audible and graphical indicator.

As described above, in one embodiment, the notable symbol is associated with one or more indicators such that if the notable symbol appears within the symbol display region, the gaming device processor produces or generates the indicator or indicators associated with the notable symbol. For example, referring back to FIG. 4, when notable symbol A appears within the symbol display region, the gaming device processor produces or generates: (a) sound A; (b) graphical indicator A; or (c) sound A and graphical indicator A.

As indicated by block 212, the gaming device processor continues the indicator while the notable symbol appears within the symbol display region. In one embodiment, the gaming device processor continues the indicator while the notable symbol appears within the symbol display region while the reel spins.

In one embodiment, the gaming device processor causes the reel to stop spinning. As indicated by block 214, the gaming device displays the stopped reel. In one embodiment, the gaming device processor indicates the stopping of the reel, as indicated by block 216. In one embodiment, the gaming device processor produces or generates a reel stop sound to indicate that the reel has stopped spinning.

As indicated by block 218, the gaming device processor determines whether an award condition is satisfied based on one or more of the symbols of the stopped reel. The gaming device processor determines whether the award condition is satisfied based on the symbols displayed within the symbol display region after the reel stops.

In one embodiment, the symbol display region is divisible into a plurality of sub-regions, including at least a first sub-region and a second sub-region located adjacent to the first sub-region. The symbols pass through the sub-regions while the reel spins.

In operation of one such embodiment, the gaming device processor determines whether the notable symbol will appear at the first sub-region while the at least one reel is spinning. This determination occurs or is performed before the notable symbol reaches the first sub-region. In one embodiment, the gaming device processor determines whether the notable symbol will appear at the first sub-region before the reel spins. In another embodiment, the gaming device processor determines whether the notable symbol will appear at the first sub-region while the reel is spinning. In one embodiment, the gaming device processor determines whether the notable symbol will appear at the first sub-region independent of at least one payline.

Based on the determination, the gaming device processor indicates the presentation or appearance of the notable symbol at the first sub-region. In different embodiments, the gaming device processor indicates the presentation or appearance of the notable symbol at the first sub-region with: (a) an audible indicator, such as one of the audible indicators 114 described above; (b) a graphical indicator, such as one of the graphical indicators 116 described above; or (c) a combination of an audible and graphical indicator.

While the reel is spinning, the gaming device processor continues the indicator as the notable symbol moves from the first sub-region in a direction toward the second sub-region. After a reel stop event occurs, the gaming device processor displays the stopped reel. The gaming device processor indicates the stopped reel with a reel stop indicator, such as an audible sound. In one embodiment, the reel stop indicator is different from the indicator of the appearance of the notable symbol. For example, if the gaming device processor indicates the appearance of the notable symbol with a first sound, the gaming device processor indicates the stopping of the reel with a second, different sound. In one embodiment, the second, different sound associated with the reel stopping is a modified version of the first sound. For example, the second, different sound has a different characteristic, such as pitch or tempo.

After the reel stops, the gaming device processor determines whether an award condition is satisfied based on one or more of the symbols revealed by the first and second sub-regions of the symbol display region. If one or more of the symbols revealed by the first and second sub-regions of the symbol display region satisfy an award condition, the gaming device processor indicates or provides an award associated with the award condition.

In the example illustrated in FIGS. 9A to 9E, the display device 16 displays a game play screen for one embodiment of the described gaming system. For ease of illustration, the game play screens display the paylines 52, reels 54, symbols 102 and 104 and other relevant game information. In alternative embodiments, the game play screens are divided between different areas of the display device 16 or divided between the display devices 16 and 18. Alternatively, the display device 18 is configured to display the game play screens.

Figure 9A:
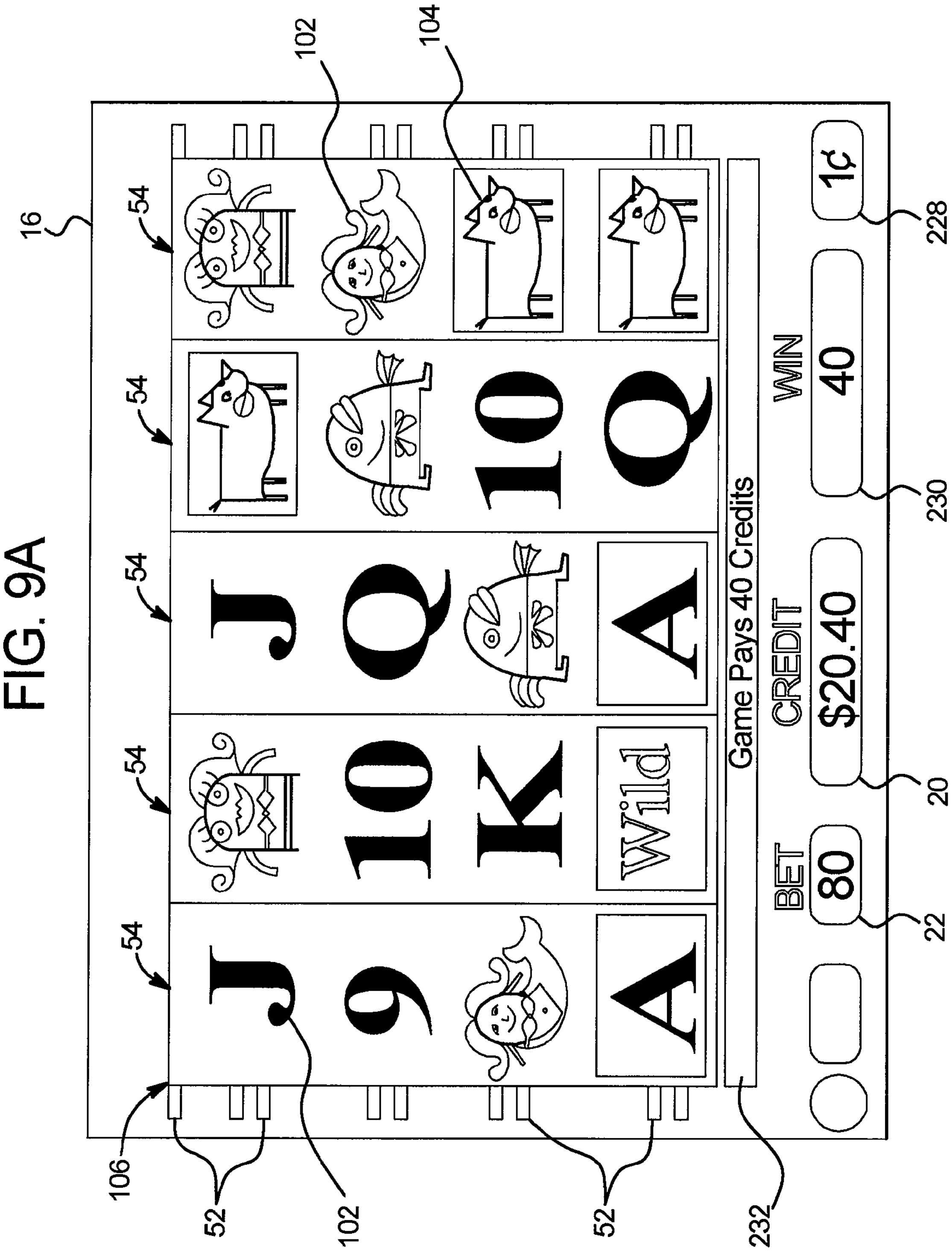
FIGS. 9A, 9B, 9C, 9D, and 9E are enlarged front plan views of a display device of one of the gaming devices disclosed herein, illustrating example screen shots of one embodiment of the gaming system where one or more indicators are associated with one or more symbols of a game.

In the example illustrated in FIG. 9A, the display device 16 simulates or displays a plurality of reels 54 having a plurality of symbols 102 or 104. As illustrated in FIG. 9A, each "WOLF" symbol is a notable symbol 104. In this embodiment, the notable "WOLF" symbols 104 are part of a symbol stack. For example, the symbol stack includes a plurality of notable "WOLF" symbols which overlie one another at a single reel position and act as wild symbols. In this example, the display device 16 illustrates the symbol display region 106 which forms a window or perimeter around the 3×5 symbol matrix. The reels 54 spin for each play or initiation of a game. After the reels 54 stop spinning, the gaming device processor evaluates the symbols 102 and 104 which appear within the symbol display region 106 to determine an outcome for the game. If the outcome is a winning outcome, the gaming device processor provides or indicates an award associated with the winning outcome to the player.

The display device 16 displays the credit display 20 and the bet display 22. The credit display 20 displays the player's current number of credits, cash, or account balance. The bet display 22 displays the player's wager or an amount of credits or cash wagered for the play of the game. In one embodiment, as described above, the display device 16 also displays the player tracking display which displays information regarding the player's play tracking status. As illustrated in FIG. 9A, the credit display 20 indicates that the player's current number of credits or cash is $20.40 and the bet display 22 indicates that the player wagered 80 credits for a previous play of the game.

In the example illustrated in FIGS. 9A to 9E, each credit is equal to one penny as indicated by the denomination display 228. The denomination display 228 displays the denomination of each credit wagered and won by the player. In different embodiments, the denomination indicated by the denomination display 228 is selected by the gaming device operator, by the gaming device manufacturer, by the gaming device processor, by the central server, or based on an input from the player.

The display device 16 displays an award display 230. The award display 230 indicates to the player how many credits or other type(s) of award are provided in the play of the game. During an award attempt, any award received by the player is added to the award indicated by the award display 230. Once the play of the game ends, the award amount indicated by the award display 230 is provided to the player. As illustrated in FIG. 9A, the award display 230 indicates that the player won an award of 40 credits for obtaining a winning symbol combination on one of the paylines 52 for a previous play of the game.

In one embodiment, the display device 16 displays a message or instruction area 232 which displays messages or instructions to the player. In one embodiment, the gaming device processor is programmed to control which messages or instructions are displayed by the message area 232. Appropriate messages or instructions such as "GAME PAYS 40 CREDITS" OR "GOOD LUCK" may be provided to the player visually, or through suitable audio or audiovisual displays.

Figure 9B:
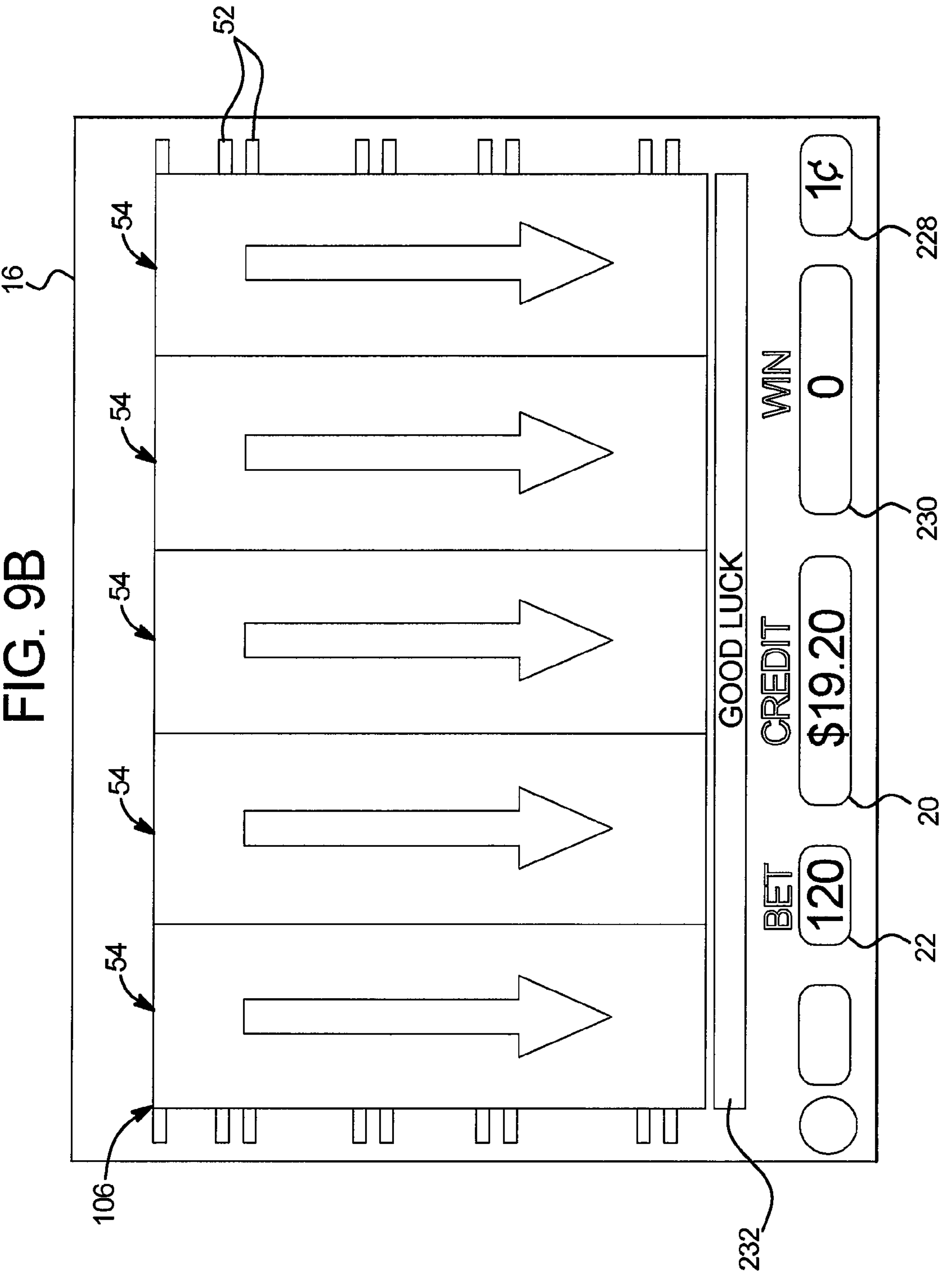

As illustrated in FIG. 9B, the display device 16 simulates or displays each of the reels 54 spinning. As described above, the reels 54 may spin simultaneously, sequentially, or individually. The credit display 20 indicates that the player has $19.20 remaining. The bet display 22 indicates that the player has wagered 120 credits or $1.20 for this play of the game. The award display 230 indicates that the player has won zero credits at this point of the game. The message or instruction area 232 indicates a message, such as "GOOD LUCK," while the reels 54 spin.

Figure 9C:
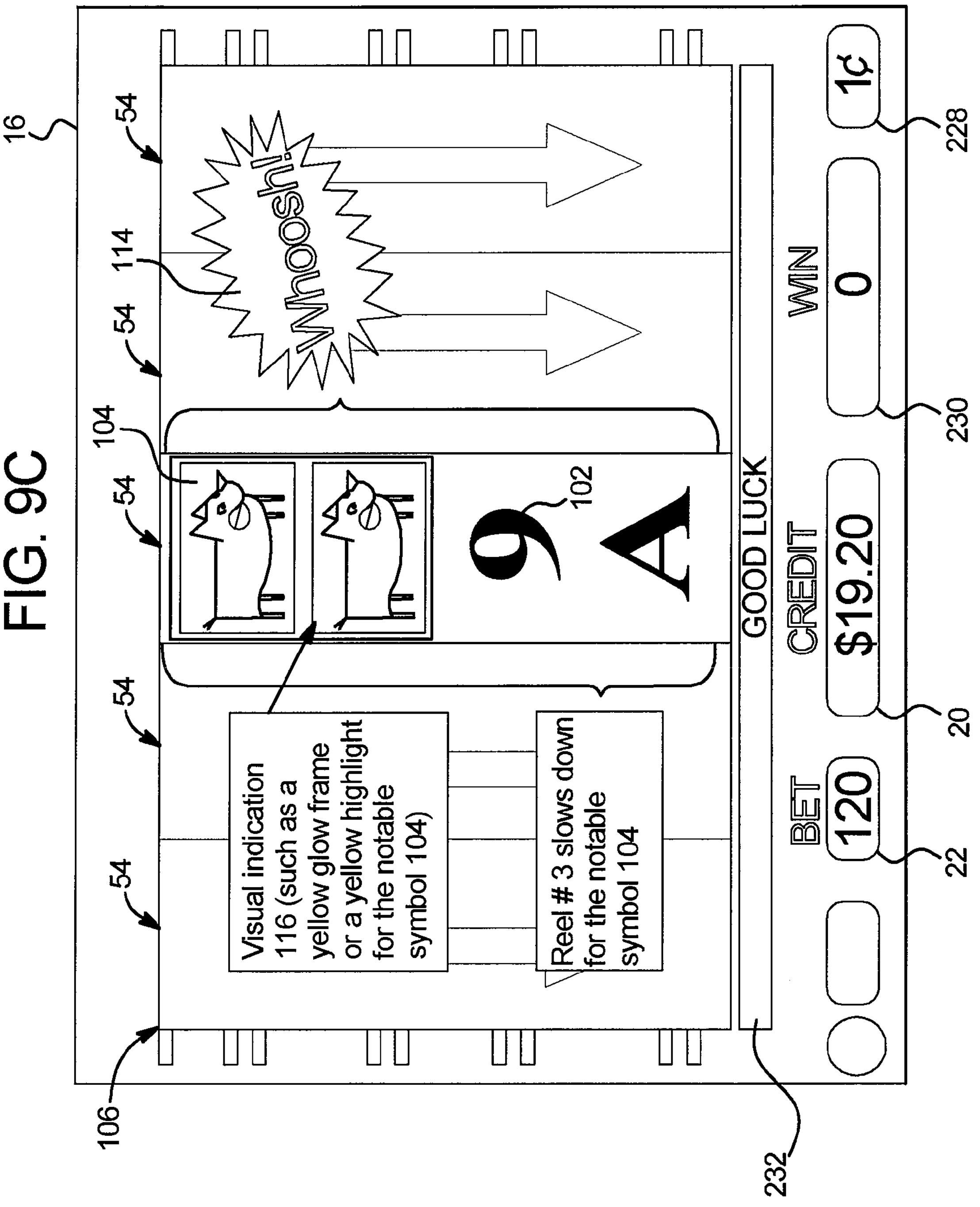

As the reels 54 spin, the symbols 102 and 104 of the reels 54 spin within the symbol display region 106 and roll into view and out of view. If one of the notable "WOLF" symbols 104 appear within the symbol display region, while one or more of the reels 54 are spinning, the gaming device processor indicates the presentation or appearance of each notable "WOLF" symbol 104. In one embodiment, the gaming device processor audibly indicates the presentation or appearance of each notable "WOLF" symbol 104. For example, as illustrated in FIG. 9C, the gaming device processor generates or produces a sound or audible indicator, such as "WHOOSH," to indicate that the notable "WOLF" symbol 104 appears within the symbol display region 106. By generating or producing a sound or audible indicator, such as a "WHOOSH" sound, the gaming device processor increases the likelihood that the player will become aware of the appearance of the notable "WOLF" symbol 104 within the symbol display region 106 as the reels 54 spin. The gaming device provides this increased awareness even though it may be difficult to visually recognize the appearance of such symbol because of the actual or simulated spinning of the reels.

In one embodiment, the gaming device processor graphically indicates the presentation or appearance of each notable "WOLF" symbol 104. For example, as illustrated in FIG. 9C, the gaming device processor produces or generates a yellow highlight or a yellow glow frame around the notable "WOLF" symbol 104 as indicated by the visual indication 116. The highlight or glow frame may be associated with any color and may be associated with different colors depending upon which notable symbol 104 is displayed within the symbol display region 106. By highlighting or producing a glow frame surrounding the notable "WOLF" symbol 104, the gaming device processor increases the likelihood that the player will become aware of the appearance of the notable "WOLF" symbol 104 within the symbol display region 106 as the reels 54 spin.

In another embodiment, the gaming device processor causes the notable "WOLF" symbol 104 to animate. For example, the gaming device processor animates the wolf of the notable "WOLF" symbol 104 so that the wolf appears to "run up the reel" as the reel spins. In this example, the wolf animates so that it appears that the wolf is trying to remain within the symbol display region 106 without "falling off" of the symbol display region 106. In one embodiment, the notable "WOLF" symbol is the uppermost symbol of a symbol stack located at a first reel position so that, as the notable "WOLF" symbol animates to "run up the reel," at least one underlying symbol of the symbol stack remains at the first reel position. The animation increases the likelihood that the player will become aware of the appearance of the notable "WOLF" symbol 104 within the symbol display region 106 as the reels 54 spin.

In another embodiment, the gaming device processor changes the speed of any reels 54 which are associated with the notable "WOLF" symbol 104. In one such embodiment, as illustrated in FIG. 9C, the gaming device processor slows the speed of each reel 54 on which the notable "WOLF" symbol 104 appears. In one embodiment, the reel or reels 54 only slow when a notable symbol 104, such as the "WOLF" symbol, appears on the reel or reels 54. By slowing down the reel or reels 54 on which the notable "WOLF" symbol 104 appears, the gaming device processor increases the likelihood that the player become aware of the presentation or appearance of the notable "WOLF" symbol 104 within the symbol display region 106 as the reel or reels 54 spin.

In one embodiment, the gaming device processor simulates changing the speed of any reels 54 which are associated with the notable "WOLF" symbol 104 by half-stepping or quarter-stepping the notable "WOLF" symbol 104 as described above. Half-stepping or quarter-stepping the notable "WOLF" symbol 104 during the spinning of the reel 54 simulates slowing down the reel 54 on which the notable "WOLF" symbol 104 appears because the notable "WOLF" symbol appears at more locations along the reel 54 for each spin of the reel 54.

It should be appreciated that one or more of the reels 54 spin at a regular speed if the notable "WOLF" symbol 104 does not appear within the symbol display region 106. As illustrated in FIG. 9C, the first, second, fourth and fifth reels 54 from the left side of the display device 16 spin at a regular speed. This is because, as illustrated in FIG. 9C, the notable "WOLF" symbol 104 only appears on the third reel from the left side of the display device 16. For the appearance of the notable "WOLF" symbols 104, the gaming device processor is programmed to: (a) slow the speed of the third reel 54; (b) generate or produce a sound (e.g., "WHOOSH") or any other suitable audible indicator; (c) generate a highlight, a glow frame or any other suitable graphical indicator around the notable "WOLF" symbols 104; or (d) perform any combination of (a), (b) and (c) in association with the notable "WOLF" symbols 104 of the third reel 54.

Figure 9D:
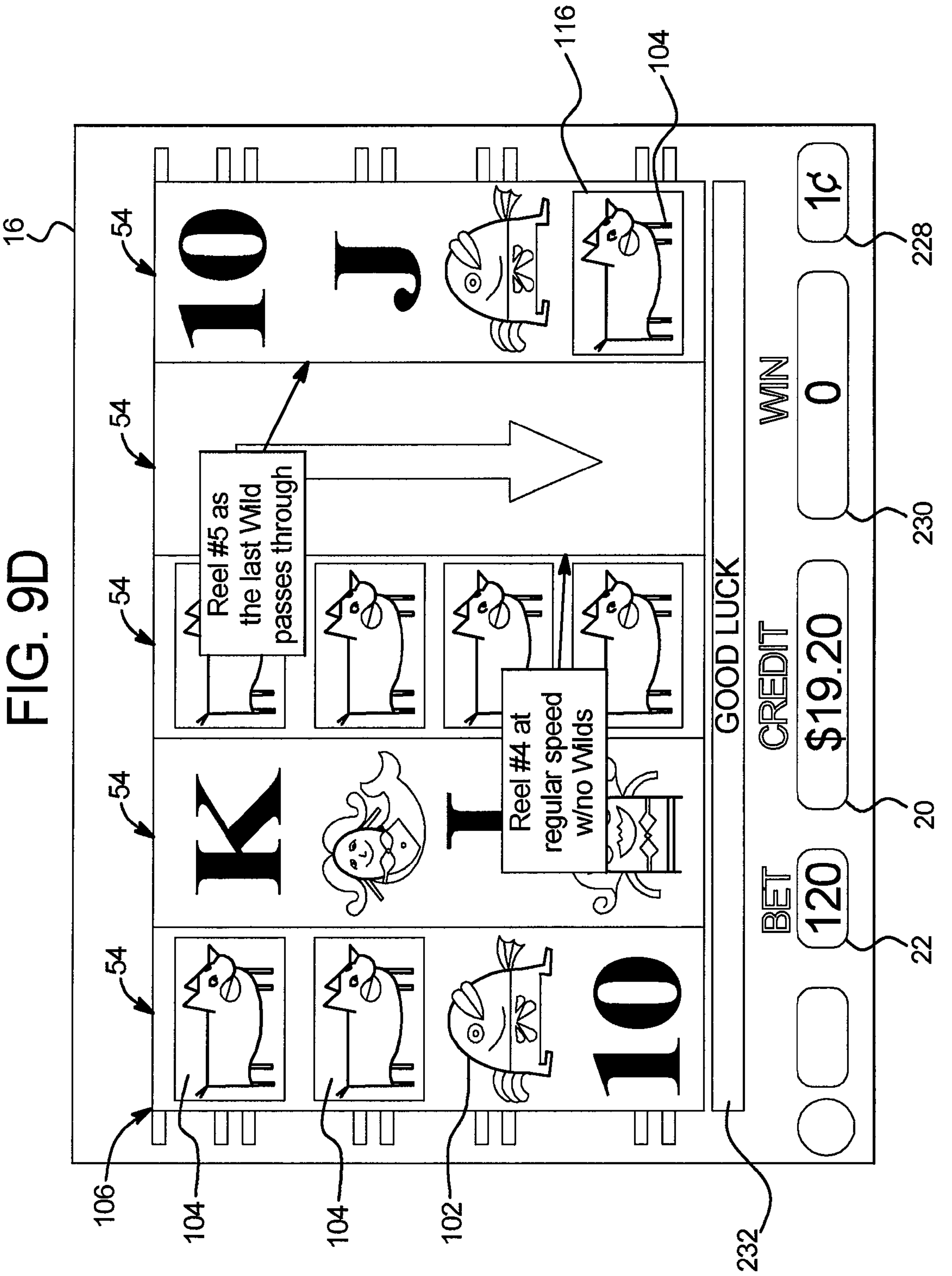

In the example illustrated in FIG. 9D, the first, second, and third reels 54 have stopped. The fourth reel 54 continues to spin at its regular speed. As illustrated in FIG. 9D, a notable "WOLF" symbol 104 appears on the fifth reel 54. The gaming device processor indicates the notable "WOLF" symbol 104 by slowing the speed of the fifth reel 54 when the notable "WOLF" symbol 104 appears within the symbol display region 106. The fifth reel 54 remains spinning at the slower speed until part or all of the notable "WOLF" symbol 104 no longer appears within the symbol display region 106.

Figure 9E:
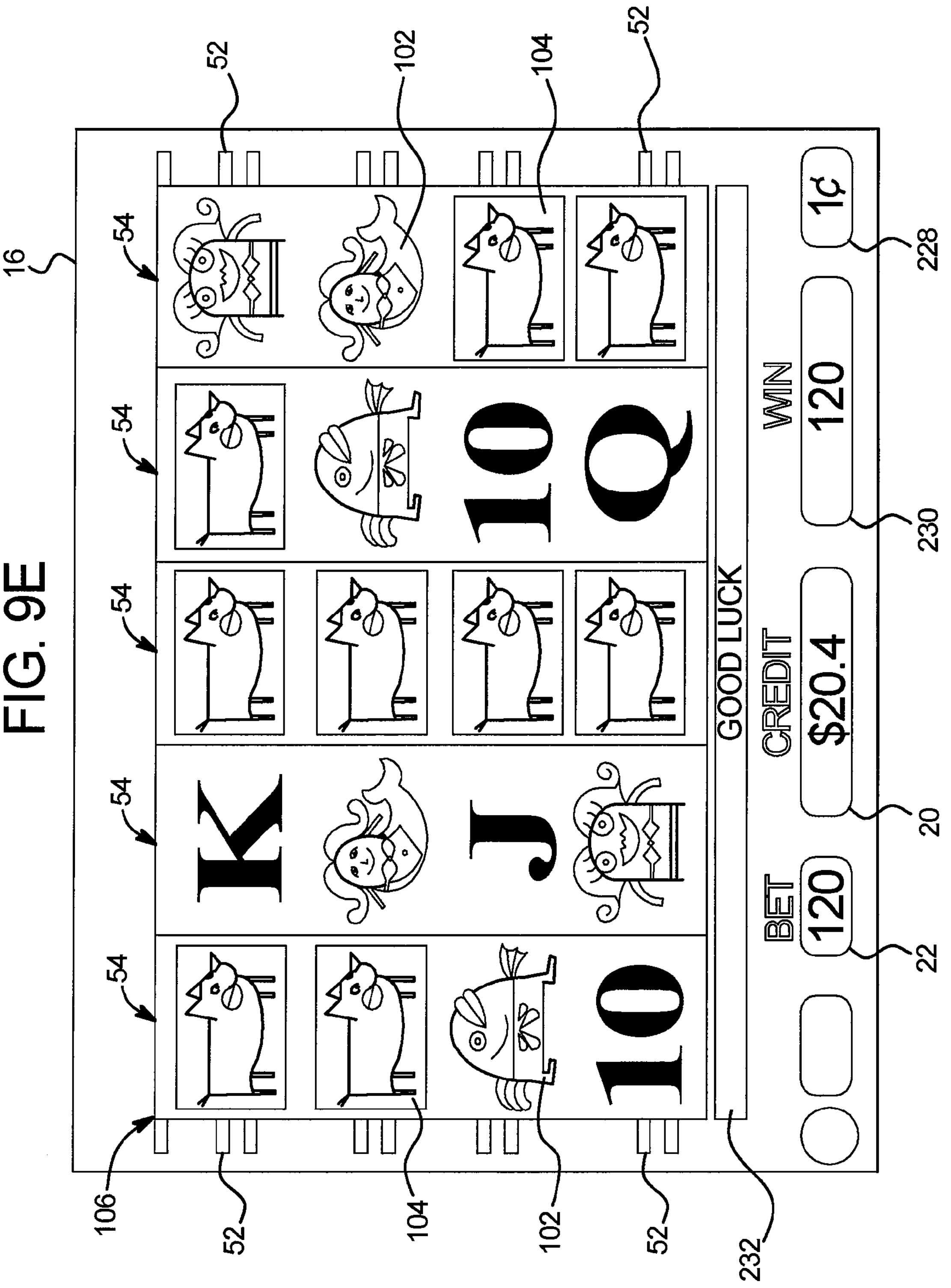

In the example illustrated in FIG. 9E, the reels 54 have stopped. Once the reels 54 have stopped, the gaming device processor indicates the stopping of at least one reel by providing a reel stop sound. In this example, the reel stop sound is different than any audible indicator associated with the notable "WOLF" symbol 104. The gaming device processor determines whether the award condition is satisfied based on the symbols 102 and 104 displayed within the symbol display region 106 after the reels 54 stop.

In the example illustrated in FIG. 9E, the gaming device processor determines that the symbols 102 and 104 on one or more of the paylines 52 within the symbol display region 106 correspond to an award of 120 credits. The award display 230 indicates that the player won an award of 120 credits for obtaining a winning symbol combination on two of the paylines 52 for the play of the game. The credit display 20 indicates that the player's current number of credits or cash has increased to $20.40. The message area 232 indicates an appropriate message such as "GAME PAYS 120 CREDITS" which may be provided to the player visually, or through suitable audio or audiovisual displays.

It should be appreciated that, in one embodiment, the associations between the indications and the notable symbols may be applied for each play of a game played at the gaming device. In one embodiment, the associations between the indications and the notable symbols are selectively applied based on an input received from the player. In one embodiment, the associations between the indications and the notable symbols are applied based on one or more suitable triggering events or qualifying conditions described above. For example, after an occurrence of a triggering event, a designated notable symbol is associated with one or more designated indications. In one embodiment, the associations between the indications and the notable symbols change after one or more suitable triggering events or qualifying conditions.

In one embodiment, the associations between the indications and the notable symbols last for a designated period. In one embodiment, the designated period is based on an amount of time. In another embodiment, the designated period is based on an amount of games played at the gaming device by the player. In different other embodiments, the designated period is based on a predetermined value, based on a random determination, based on the player's status (such as determined through a player tracking system), based on a generated symbol or symbol combination, based on one or more side wagers placed by the player, based on the player's primary game wager, based on time (such as the time of day), based on a determination by the game operator or based on any other suitable method or criteria.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one display device;

at least one input device;

at least one processor; and at least one memory device storing a plurality of instructions which, when executed by the at least one processor, cause the at least one processor to operate with the at least one display device and the at least one input device to:

(a) receive an input corresponding to a wager;

(b) display at least one reel spinning, the at least one reel having a plurality of symbols including at least one designated symbol;

(c) display part of the at least one reel within a symbol display region, the symbol display region having at least:

(i) a first sub-region configured to reveal one of the symbols; and (ii) a second sub-region configured to reveal one of the symbols, the second sub-region being adjacent to the first sub-region;

(d) indicate at least one payline corresponding to at least one of the first sub-region and the second sub-region;

(e) while the at least one reel is spinning, determine whether the at least one designated symbol will appear at the first sub-region;

(f) if it was determined that the at least one designated symbol will appear at the first sub-region, cause a first audible indication when any part of the at least one designated symbol appears at the first sub-region regardless of whether the at least one payline corresponds to the first sub-region or the second sub-region;

(g) continue the first audible indication while the at least one designated symbol moves in a direction from the first sub-region toward the second sub-region;

(h) display the at least one reel stopped after a reel stop event occurs;

(i) cause a second audible indication when the at least one reel stops, said second audible indication being different from the first audible indication; and (j) determine whether an award condition is satisfied based on one or more of the displayed symbols.

2. The gaming system of claim 1, wherein the first audible indication is selected from the group consisting of: a sound, a sound having a tempo, a sound having a pitch, a musical note, and a song.

3. The gaming system of claim 1, wherein the plurality of instructions when executed by the at least one processor, cause the at least one processor to operate with the at least one display device and the at least one input device to:

(a) if it was determined that the at least one designated symbol will appear at the first sub-region, cause a graphical modification of the at least one designated symbol when any part of the at least one designated symbol appears at the first sub-region; and (b) continue the graphical modification of the at least one designated symbol while the at least one designated symbol moves in a direction from the first sub-region toward the second sub-region.

4. The gaming system of claim 3, wherein the graphical modification of the at least one designated symbol is selected from the group consisting of: a changing of a color of the at least one designated symbol, a highlighting of the at least one designated symbol, an activation of a glow frame substantially surrounding the at least one designated symbol, a blinking of the at least one designated symbol, an animation of the at least one designated symbol, or a change in position of the at least one designated symbol.

5. The gaming system of claim 1, wherein the at least one designated symbol is predetermined.

6. The gaming system of claim 1, wherein the at least one designated symbol is randomly determined.

7. The gaming system of claim 1, wherein the first audible indication includes a first sound, and the second audible indication includes a second, different sound.

8. The gaming system of claim 7, wherein the first sound has at least one different characteristic from the second, different sound.

9. The gaming system of claim 8, wherein the at least one different characteristic is selected from the group consisting of: a volume, a pitch, a tempo, and a frequency.

10. The gaming system of claim 1, wherein the plurality of symbols includes a plurality of the designated symbol, a first designated symbol is associated with the first audible indication, and a second, different designated symbol is associated with an audible indication which is different than the first audible indication.

11. The gaming system of claim 1, wherein the plurality of instructions, when executed by the at least one processor, cause the at least one processor to operate with the at least one display device to:

change the first audible indication while the at least one designated symbol moves in the direction from the first sub-region toward the second sub-region, and stop the first audible indication when each part of the at least one designated symbol no longer appears at the second sub-region.

12. A gaming system comprising:

at least one display device;

at least one input device;

at least one processor; and at least one memory device storing a plurality of instructions which, when executed by the at least one processor, cause the at least one processor to operate with the at least one display device and the at least one input device to:

(a) receive an input corresponding to a wager;

(b) display at least one reel spinning, the at least one reel having a plurality of symbols including at least one designated symbol;

(c) display part of the at least one reel within a symbol display region, the symbol display region having a plurality of sub-regions, each one of the sub-regions being one of:

(i) an evaluation sub-region configured to reveal one of the symbols; and (ii) a non-evaluation sub-region configured to reveal one of the symbols, the non-evaluation sub-region being adjacent to the evaluation sub-region;

(d) while the at least one reel is spinning, determine when the at least one designated symbol will initially appear at a first one of the sub-regions;

(e) based on said determination, cause a first audible indication when any part of the at least one designated symbol, and none of the other symbols, appears at the first one of the sub-regions regardless of whether the first one of the sub-regions is the evaluation sub-region or the non-evaluation sub-region;

(f) continue the first audible indication while the at least one designated symbol moves from the first one of the sub-regions and past the other sub-regions, at least one which is the non-evaluation sub-region;

(g) display the at least one reel stopped after a reel stop event occurs;

(h) cause a second audible indication when the at least one reel stops, said second audible indication being different from the first audible indication; and (i) determine whether an award condition is satisfied based on one or more of the symbols which are displayed stopped at the evaluation sub-regions.

13. The gaming system of claim 12, wherein the first audible indication is selected from the group consisting of: a sound, a sound having a tempo, a sound having a pitch, a musical note, and a song.

14. The gaming system of claim 12, wherein the at least one designated symbol is predetermined.

15. The gaming system of claim 12, wherein the at least one designated symbol is randomly determined.

16. The gaming system of claim 12, wherein the first audible indication includes a first sound, and the second audible indication includes a second, different sound.

17. The gaming system of claim 16, wherein the first sound has at least one different characteristic from the second, different sound.

18. The gaming system of claim 17, wherein the at least one different characteristic is selected from the group consisting of: a volume, a pitch, a tempo, and a frequency.

19. The gaming system of claim 12, wherein the plurality of symbols includes a plurality of the designated symbol, a first designated symbol is associated with the first audible indication, and a second, different designated symbol is associated with an audible indication which is different than the first audible indication.

20. A method of operating a gaming system, the method comprising:

causing at least one processor to execute a plurality of instructions stored in at least one memory device to operate with at least one input device and at least one display device to:

receive an input corresponding to a wager;

display at least one reel spinning, the at least one reel having a plurality of symbols including at least one designated symbol;

display part of the at least one reel within a symbol display region, the symbol display region having at least:

(a) a first sub-region configured to reveal one of the symbols; and (b) a second sub-region configured to reveal one of the symbols, the second sub-region being adjacent to the first sub-region;

indicate at least one payline corresponding to at least one of the first sub-region and the second sub-region;

while the at least one reel is spinning, determine whether the at least one designated symbol will appear at the first sub-region;

if it was determined that the at least one designated symbol will appear at the first sub-region, cause a first audible indication when any part of the at least one designated symbol appears at the first sub-region regardless of whether the at least one payline corresponds to the first sub-region or the second sub-region;

continue the first audible indication while the at least one designated symbol moves in a direction from the first sub-region toward the second sub-region;

display the at least one reel stopped after a reel stop event occurs;

cause a second audible indication when the at least one reel stops, said second audible indication being different from the first audible indication; and determine whether an award condition is satisfied based on one or more of the revealed symbols.

21. The method of claim 20, wherein the first audible indication is selected from the group consisting of: a sound, a sound having a tempo, a sound having a pitch, a musical note, and a song.

22. The method of claim 20, which includes causing the at least one processor to execute the plurality of instructions to operate with the at least one display device to:

change the first audible indication while the at least one designated symbol moves in the direction from the first sub-region toward the second sub-region, and stop the first audible indication when each part of the at least one designated symbol no longer appears at the second sub-region.

23. The method of claim 20, which includes causing the at least one processor to execute the plurality of instructions to operate with the at least one display device to:

(a) if it was determined that the at least one designated symbol will appear at the first sub-region, cause a graphical modification of the at least one designated symbol when any part of the at least one designated symbol appears at the first sub-region; and (b) continue the graphical modification of the at least one designated symbol while the at least one designated symbol moves in the direction from the first sub-region toward the second sub-region.

24. The method of claim 23, wherein the graphical modification of the at least one designated symbol is selected from the group consisting of: a changing of a color of the at least one designated symbol, a highlighting of the at least one designated symbol, an activation of a glow frame substantially surrounding the at least one designated symbol, a blinking of the at least one designated symbol, an animation of the at least one designated symbol, or a change in position of the at least one designated symbol.

* * * * *